United States Patent
Dove et al.

(10) Patent No.: US 6,193,393 B1
(45) Date of Patent: Feb. 27, 2001

(54) APPARATUS AND METHOD FOR INTENSIFYING ILLUMINATION BRIGHTNESS BY TIME-SUPERPOSING MULTIPLE PULSED LIGHT SOURCES

(75) Inventors: Derek Brian Dove, Mt. Kisco; Alan Edward Rosenbluth, Yorktown Heights; Kei-Hsiung Yang, Katonah, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/151,178

(22) Filed: Sep. 10, 1998

(51) Int. Cl.[7] .................................................. F21V 23/04
(52) U.S. Cl. .......................... 362/251; 362/247; 362/265
(58) Field of Search .............................. 362/11, 13, 18, 362/234, 251, 276, 802, 322, 325, 279, 284; 399/52; 358/509; 355/70; 326/247, 265

(56) References Cited

U.S. PATENT DOCUMENTS

| | | | | |
|---|---|---|---|---|
| 2,816,477 | * | 12/1957 | Waller | 362/18 |
| 4,299,481 | * | 11/1981 | Chapman | 355/70 |
| 4,364,658 | * | 12/1982 | Seto et al. | 355/70 |
| 4,429,353 | * | 1/1984 | Tokuhara et al. | 355/70 |
| 4,576,462 | * | 3/1986 | Lehman | 362/18 |
| 5,754,922 | * | 5/1998 | Bessho | 399/52 |
| 5,765,934 | * | 6/1998 | Okamori et al. | 362/234 |

* cited by examiner

Primary Examiner—Sandra O'Shea
Assistant Examiner—Peggy Neils
(74) Attorney, Agent, or Firm—Scully, Scott, Murphy & Presser; Daniel P. Morris, Esq.

(57) ABSTRACT

An illumination apparatus including: at least two light sources, in which each of the light sources produce independent light beams; a controller for sequentially driving each of the light sources at a high power above their respective maximum rated power, to produce a respective light beam for each light source, and for leaving the remaining light sources at a low power below their respective maximum rated power, such that the time-average of the high and low power levels are set to a predetermined value for each of the light sources; and a combiner and director for sequentially combining each of the light beams from their respective light sources while being driven at high power into a common output beam with a fixed direction. Various combiner and directors are disclosed including tiltable mirrors under the control of the controller as well as optical systems.

44 Claims, 18 Drawing Sheets

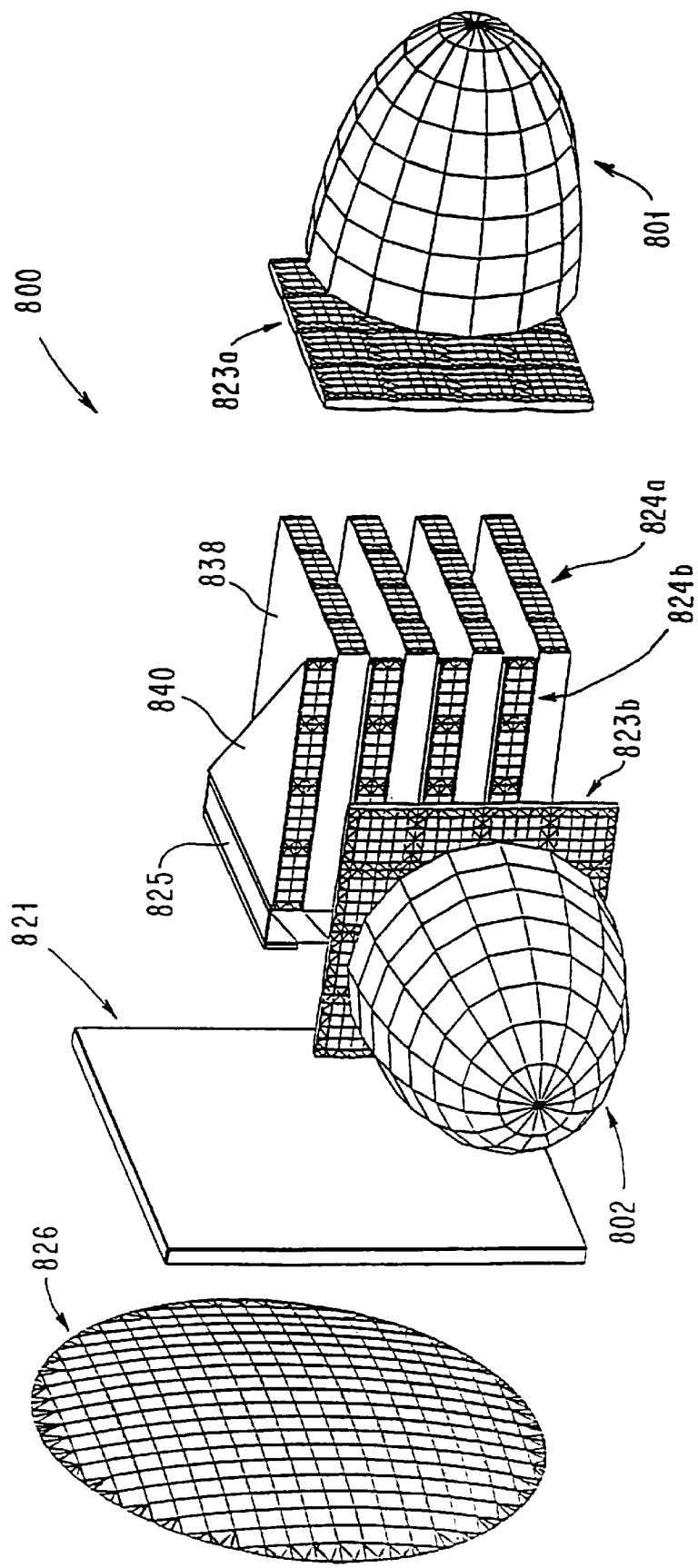

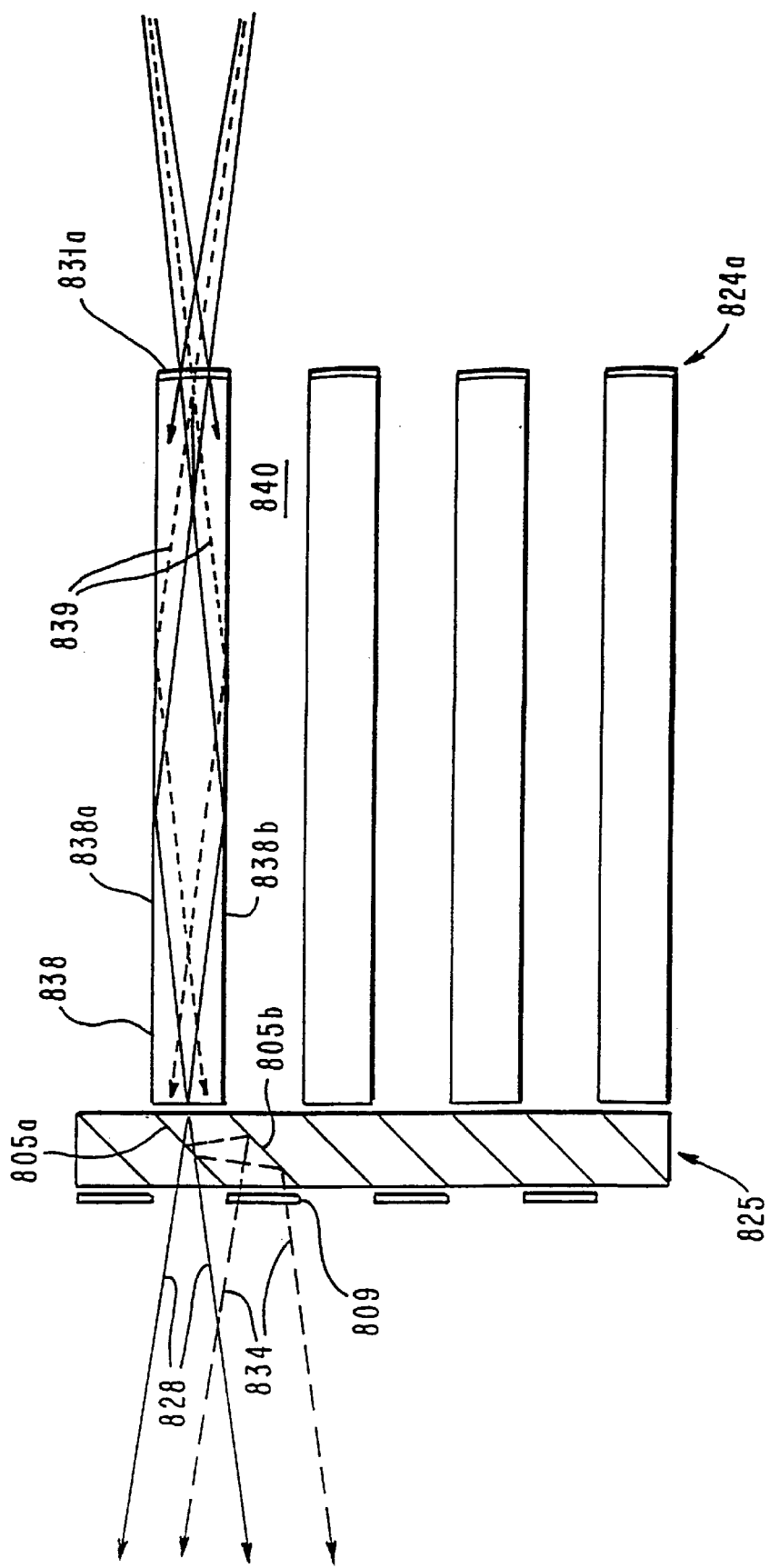

APPARATUS AND METHOD FOR INTENSIFYING ILLUMINATION BRIGHTNESS BY TIME-SUPERPOSING MULTIPLE PULSED LIGHT SOURCES

BACKGROUND OF THE INVENTION

1. Field of the Invention

The present invention is directed to optical illumination systems and more specifically to optical illumination systems that incorporate time-modulated light sources and recombining modulators to increase brightness.

2. Description of the Related Art

It is well known in the art that the brightness of a light source cannot be increased by a passive optical system. Here "brightness" is used in the technical sense of optical power per unit emission etendue, where emission etendue is the product of solid angle in the emitted direction times source area measured in a cross-section perpendicular to emitted direction.

Just as a non-attenuating optical system must preserve source brightness, so it must also preserve as invariant the product of the solid angle of the illuminating light and the cross-section area of the focused illumination beam. The divergence (or convergence) of the beam can be decreased if minimum beam diameter is allowed to increase. Conversely, minimum beam diameter can be decreased if the beam is made more divergent (or convergent). However, it is only possible to make both improvements simultaneously if part of the beam is blocked, which reduces collected power. For given fixed source brightness, the light received by an illuminated object of fixed area is thus determined by the solid angle that the illuminating light occupies. A geometrically equivalent statement is that, for given fixed source brightness, the optical power projected by illuminating optics of fixed diameter is determined by the solid angle into which the optics project the light. The optical system designer must ensure that the source is powerful enough to radiate with this fixed brightness into all regions within the lens diameter, and into all directions within the output solid angle, and that the diameter and solid angle are well chosen according to the various constraints of the application. However, once the source brightness, diameter, and solid angle are fixed in this way, the designer can only increase the delivered power by minimizing absorption and scatter within the system; he cannot redesign the system to concentrate more power into the limited diameter and solid angle.

These constraints of fundamental physics significantly limit the optical designer's freedom to increase illumination intensity. For example, the following equation shows that even if an illumination system can collect all rays emitted by a source of width S, maximum possible delivered power is achieved once one chooses the source large enough that $|S| \geq |P\alpha|$, where P is the lens diameter and $\alpha$ the angle that the optical system projects into. When this condition is satisfied, the lens aperture is completely filled by the source, and maximum intensity is delivered within the projection angle $\alpha$. Unfortunately, if S is increased beyond the point needed to fill the lens, the overfilling light cannot be collected, and the extra light that is output by the larger source is therefore wasted. On the other hand, when $|S|<P\alpha|$, the source is too small to fill the aperture, and illumination intensity can be increased by increasing the source size, which, for a fixed class of light source, means increasing the power consumption of the source. Image intensity is said to be power-limited in this case.

However, once $|S|>|P\alpha|$, further increases in source power do not increase image intensity because the additional source area is not collected within the lens aperture. Image intensity in this case is said to be brightness-limited. Loosely speaking, one might say that when the source is brightness-limited, image intensity can only be increased by increasing the brightness of the collected rays; increasing the size of the emitting region to produce 'more rays' does not help.

The field size or angle $\alpha$ is often fixed by the application. To increase image intensity once the brightness limit is reached, the designer can increase the lens diameter P (or equivalently, increase the numerical aperture [NA], defined essentially as the ratio of lens aperture radius P/2 to object distance). However, technical constraints on lens performance and/or practical constraints on cost often limit the feasibility of increasing the lens diameter. This is particularly true in projection optical systems, where the illuminated object is re-imaged by a projection lens. High quality projection lenses must not only be designed to capture the full angular and spatial extent of the light that is reflected or transmitted by the illuminated object, they must also project a high resolution image of the object using this light. Image aberrations increase as lens diameter is scaled up. Resolution requirements are particularly stringent in photolithography systems. In projection displays the optics frequently include elements for color and polarization separation/recombination whose cost scales very unfavorably with NA. Thus, in photolithography projectors or projection displays it is not easy to increase the NA of the projection system.

Of course, one requirement for maximizing brightness is that the brightest available source be chosen for the system, which essentially means using the source that produces the greatest intensity on each collected ray. It is common practice to use arc lamps in applications that demand high intensity within a limited NA or object size. It is well known that arc lamps are the brightest light sources available, with the important exception of laser sources. From the point of view of geometrical optics, a laser can be considered to be a true point source, i.e. a source having infinitesimal extent, so that optical systems using laser sources are always power-limited and never brightness-limited. Practical issues with laser sources are often cost and size, particularly as power levels rise into the 1-Watt regime and above. Compact arc lamps in the 1000-Watt range can cost several hundred dollars and might occupy ~200 cubic inches in the illuminator (plus remote power supply). Depending on the lamp, the portion of the consumed power radiated as visible light might be 200 Watts. The cost of a laser in the 200-Watt range might be tens or hundreds of times that of the lamp, and the laser might occupy tens or hundreds of times the volume. Though the situation may change in the future, for many applications laser sources are often severely underpowered when practical constraints are enforced on cost and size. On the other hand, while practical non-laser sources can provide very high power, they do so from an extended emitting region, which means that in many applications the power they actually deliver does not reach ideal levels before a brightness-limited regime is reached.

What is needed is a way to increase the brightness of the emitting region itself. However, commercial high brightness light sources are usually engineered to generate as much energy within the emission volume as is technologically possible. For example, when an arc lamp is steadily powered above its rated level, its lifetime decreases catastrophically (i.e. dropping from hundreds or thousands of hours to a few hours). Steady output at increased power requires that the lamp must have a larger arc gap; this means that the source is increased in size but not in brightness.

Brightness can often be increased for brief intervals, but the application must permit the increased emission to accomplish its purpose before damage mechanisms in the source are initiated by the accelerated operation. The source must then be switched off for a sufficient interval to hold time-averaged power below the maximum rated level. It is known in the art that total visible light emission can be improved by pulsing a metal halide lamp, even though total power consumption is held fixed in the time-average, but for simplicity we will assume that time-averaged visible light output is neither increased nor decreased by pulsing. For example, in color-sequential displays it is known that one can periodically pulse LED sources in a way that holds their time-averaged emitted power within tolerance, but which alternates periods of intense emission with periods of non-emission in which the display can be reset for the next color or color bit. Similarly, in photolithography it is known that if one keeps lamp emission very low during periods in which the shutter is closed (for example, while silicon wafers are being loaded, aligned, or stepped to the next chip exposure position), one can cycle the intensity to a higher than normal level during the actual expose period (duration usually <1 second). However, this is not useful in applications where light is required continuously.

Another approach that can provide limited increases in brightness has to do with a simplification made in the above discussion of source brightness in an optical system. The emitting region of a source does not usually have uniform brightness or sharply defined edges. For example, the emitting region of an arc lamp is roughly defined by the gap between discharge electrodes (perhaps ~2 mm), but source brightness is usually highest near the electrodes and falls off in the middle of the gap (as well as decreasing radially outward). The lamp reflector often increases this brightness non-uniformity. In a real system there is usually not a sharp transition between the power-limited and brightness-limited regimes, making it sometimes preferable for the designer to choose a source large enough that some of the dimmer light in the outer regions of the source is not collected, in order to increase the size of the central high brightness region. Thus, the decision about how to choose a source which best matches into the optics involves a tradeoff between efficiency and total collected light. However, as source size is increased this tradeoff becomes increasingly unproductive until a purely brightness-limited regime is reached.

Other techniques for intensity increase have to do with combining two sources, or combining two images of a single source. As per the above discussion, there is a fundamental physical limitation that reduces the benefit attainable from such combination techniques. It is impossible to merge two incoherent rays that propagate from different points or in different directions into a single ray with twice the energy, unless the initial pair have different wavelengths, or are in different polarization states. A limited exception arises if one of the rays is generated by a source that is not opaque. However, in practice this possibility proves difficult to exploit; for example recombination of a polarization-converted beam with the unconverted component by re-imaging it through the arc is typically not found to be very efficient. Thus, two sources that are unpolarized or of matched polarization can only be combined into a single effective source if the combined source is made twice as large, or is made to radiate into twice as large an angle [or some combination thereof]. Such a doubling of beam width or directional divergence is not useful in a brightness-limited situation. If an unpolarized source is to be used in an application requiring polarized light, the designer can arrange to separate the unpolarized source beam into separate beams of opposite polarization, and can then convert the polarization of one of the beams to match that of the other, both beams thereby emerging in the polarization needed for the application. This effectively doubles the source power in the desired polarization. However, for fundamental reasons it is impossible to merge the two beams into a common beam of doubled power but unchanged width and divergence. As noted above, in practice there is not a sharp division between the power-limited and brightness-limited regimes, and the designer can often arrange for rays from a high brightness region of the converted beam to displace rays from a low brightness region of the other beam. This improvement is not as large as the 2× increase that would be obtained if the two sets of rays could actually be merged, but average brightness is increased somewhat.

FIGS. 1a and 1b show a known arrangement for effecting this conversion and recombination. (In a working system the FIG. 1a optics would typically be followed by additional illumination optics, a target, and optics to project an image of the illuminated target.) Light source 100 is of a well-known kind, consisting of an arc lamp 102 with curved reflector 104 (such as a paraboloid) that projects the emitted light as a beam. Light source 100 can alternatively include a lens (not shown) to collimate or focus the output beam. Alternatively, such collimating or focussing functions can be carried out by the reflector 102 alone. Light source 100 projects an unpolarized beam 106 into a polarizing beam-splitter 108, hereinafter referred to as a PBS. Within PBS 108 a polarizing coating 110 divides beam 106 into perpendicularly polarized components; beam 112 with polarization out of the plane of the diagram (S polarization) and beam 114 polarized within the plane of the diagram (P polarization). Mirror 116 folds beam 112 parallel to beam 114, and birefringent element 118 (most commonly a half-wave retarding plate) converts beam 112 to P polarization (matching the polarization of beam 114); thus beams 112 and 114 are combined into a wider beam of common polarization. Lens 120 collects much of the polarized light from beams 112 and 114, but in an application that is not power-limited, lens 120 will not be wide enough to collect all the light. Increasing the diameter of lens 120 would require either increasing the NA of the focused double beam, or increasing the size of the illuminated area at focus. Note that light source 100 and lens 120 are not aligned with PBS 108, nor is mirror 116 of the same length as polarizing coating 110, for reasons which may be understood from the simpler layout in FIGS. 1c and 1d. FIG. 1c shows, in schematic form, a plot 150 of the intensity that is present in beam 114 across the diameter of lens 120 if light source 100 and lens 120 are aligned with PBS 108, and if mirror 116 of the FIG. 1a arrangement is removed. The length of dashed lines 122 and 152 in FIGS. 1b and 1d, respectively, represent the diameter of lens 120, which is not wide enough to encompass all of beam 114. FIG. 1b shows in schematic form, a plot 124 of the intensity across lens 120 produced by beams 112 and beam 114 in the FIG. 1a arrangement where light source 100 and lens 120 are not aligned with PBS 108, and where mirror 116 is shorter than the polarizing coating 110. The heights of dashed lines 122 and 152 represent schematically, the average intensity levels (I) of the output beams. In the FIG. 1a arrangement, lens 120 collects less light from beam 114 than in the FIG. 1c arrangement, but the lost light is more than made up for by collection of the high brightness portion of beam 112. The part of beam 114 that is collected in the FIG. 1c arrangement but not collected in the FIG. 1a arrangement has relatively low brightness. This improvement, however, is not as large as the 2× increase that would be obtained if beams 112 and 114 could actually be merged into a single (polarized) beam of unchanged width. Some improvement is made by the FIG. 1a arrangement because brightness non-uniformities cause the collection in the FIG. 1c arrangement to be only partly brightness-limited; it is partly power-limited as well. If one tried to accomplish the improved collection of the FIG. 1a arrangement using a source beam that was larger and more powerful (and therefore more completely brightness-limited), the efficiency gain would be less.

The output beam in the FIG. 1a arrangement is polarized. In the case of unpolarized light, the simple arrangement shown in FIGS. 2a and 2b similarly effects a combination of two partly brightness-limited beams, this time from two light sources, 200a and 200b. Non-symmetric alignment of light sources 200a and 200b with mirror 202 creates a brightness distribution, shown in FIG. 2b, similar to that of the FIG. 1a arrangement. In the FIG. 2a arrangement, light beam 204 from light source 200a is directed to the lens 208 simultaneously with light beam 206 from light source 200b which is first folded by mirror 202 and then directed to the lens 208. If light source 200a is not fully brightness-limited in the application of interest, it can be combined with light source 200b in the manner shown, but only at the cost of decreased efficiency, and as light source size is increased such attempts to achieve greater collected power become even less efficient. In fact, the FIG. 2a arrangement is not very practical since the limited increase in collected power that it would provide is much the same as would be obtained by simply using a single light source of larger power. Moreover, a light source of larger power often means a light source of increased emission volume that will provide little or no increase in the power collectable by near-brightness-limited optics. For the same reason, the FIG. 1a arrangement may not actually provide a great deal more light than the simple FIG. 1c arrangement; its advantage is often that it allows a similar amount of light to be obtained with a smaller light source. When such a smaller light source is used in the FIG. 1c arrangement it is significantly power-limited; with a larger light source that is near brightness-limited, the FIG. 1a arrangement typically provides only a modest increase in delivered power.

FIGS. 2c and 2d present an even starker illustration of these brightness constraints. If surface 212 of PBS 210 is a PBS coating, beam 218 will be unpolarized, and cannot have any higher intensity, shown in FIG. 2d, than would be provided by light source 200a alone (with no PBS 210), or by light source 200b alone if surface 212 were a mirror.

What is needed is a way to collect as much power from two (or more) brightness-limited or near brightness-limited beams as would be obtained were it possible to combine two such beams into a single beam of unincreased width and angular divergence; more generally, what is needed is to project more light from a fixed source volume into a fixed range of directions than is permitted by the operating power limits of available compact sources.

SUMMARY OF THE INVENTION

It is an object of the present invention to provide an apparatus and method for intensifying illumination brightness in an optical system without increasing the Numerical Aperture or lens of the system.

It is yet a further object of the present invention to provide an apparatus and method for intensifying illumination brightness in an optical system without increasing the numerical aperture or lens diameter of the system.

It is yet a further object of the present invention to provide an apparatus and method for intensifying illumination brightness in an optical system by powering light sources above their rated power levels without damaging them or decreasing their life.

It is yet a further object of the present invention to provide an apparatus and method for intensifying illumination brightness in an optical system by pulsing light sources to a power above their rated power level for applications which require continuous light.

It is still yet a further object of the present invention to provide an apparatus and method for intensifying illumination brightness in an optical system which projects more light from a fixed source volume into a fixed range of directions than is permitted by the operating power limits of available compact sources.

Accordingly, an illumination system is provided having two or more time-modulated light sources. The illumination system is for use in an optical system, for example, a projection display. A controlling unit sequentially cycles each source to high power, also ensuring that when one source is run at high power, the other sources are off or at minimum power. The duration of the high power phase is kept shorter than the time constant for accelerated damage mechanisms in the sources, and the time-averaged power level for each source is held within acceptable operating limits. A recombining modulator is synchronized with the sources in such a way that the modulator sequentially passes each of the source beams in turn into a direction in which a common output beam is formed. In some embodiments the recombining modulator sequentially switches the polarization of each source into a common output polarization state.

The recombiner modulator is preferably engineered to deflect or repolarize each source beam in a way that does not increase apparent source size or beam divergence. For this to be possible it is a fundamental physical requirement that the recombiner block all other sources when a particular source beam is being deviated into the output beam (because it is impossible to simultaneously merge two source beams into a common output beam); however, little light is blocked by this action because the other light sources are either off or operating at low power during the portion of the cycle when light from a particular light source is being passed. It should be noted that it is not necessary that a source actually be driven at constant instantaneous power during the phase of the cycle in which it is cycled high. As discussed further below, it may be advantageous with certain sources such as metal halide light sources to modulate the applied power at high frequency during the on-phase.

If the time-averaged power at which each individual source is driven equals the maximum safe operating power level, then even though the output beam width and apparent source size do not increase beyond that from a single source, the time-averaged power projected into the common output beam will be larger by a factor that can approach the total number of sources.

In a preferred embodiment, given by way of example only, and not to limit the scope of the invention, the illumination system can use first and second pulsed arc light sources that illuminate the recombining modulator through different faces of a polarizing beamsplitter, one light source illuminating the modulator in P polarization and the other in S. The recombining modulator can be a switchable FLC cell with halfwave retardation along a 45° axis in the on-state. When the second light source is cycled high, the modulator is switched to halfwave retardation, rotating the output beam to P polarization. When the first light source is cycled high, the modulator is switched off, again leaving the output beam in P polarization. In time-average, each light source is driven at rated power, but the output power is doubled without increasing beam width or divergence.

More specifically, the illumination apparatus comprises: at least two light sources, each of which produce independent light beams; a controller for sequentially driving each of the light sources at a high power above their respective maximum rated power, to produce a respective light beam for each light source, and for leaving the remaining light sources at a low power below their respective maximum rated power, such that the time-average of said high and low power levels are set to a predetermined value for each of the light sources; and combining and directing means for sequentially combining each of the light beams from their respective light sources while being driven at high power into a common output beam with a fixed direction.

In a first embodiment of the illumination apparatus of the present invention the combining and directing means comprises an array of tiltable mirrors that sequentially direct each of the light beams from their respective light sources while being driven at high power into a common output direction.

In a second embodiment of the illumination apparatus of the present invention, the at least two light sources comprise first and second light sources in which the produced light beams from each light source have a first and a second polarization, and wherein said combining and directing means comprises an optical system. In a preferred version of the second embodiment, the optical system comprises: a polarizing beamsplitter for transmitting light of the first polarization and reflecting light of the second polarization; a fold mirror collecting either the transmitted or reflected light from the beamsplitter and directing the collected light in a direction parallel to the other light; a half-wave retarder rotating either the transmitted or reflected light from the beamsplitter; and a condenser lens collecting the parallel transmitted and reflected light from the beamsplitter.

In a third embodiment of the illumination apparatus of the present invention, similar to that of the preferred version of the second embodiment the light sources are configured such that the light beam from each respective light source is made to substantially focus in the vicinity of the fold mirror and condenser lens.

In yet another preferred version of the second embodiment of the illumination apparatus of the present invention, the optical system comprises: first and second sets of light guides corresponding to the first and second light sources, each individual light guide having two substantially parallel internal coated surfaces; first and second pairs of lenslet arrays corresponding to the first and second light sources for focusing the light from individual lensets into a corresponding individual light guide; a polarizing beam splitter array for directly transmitting the light of the first polarization from each of the first and second sets of light guides, and transmitting the light of the second polarization from the first and second sets of light guides after reflection from the two internal coated surfaces, and half-wave retarding strips for converting either the directly transmitted light of the first polarization or the twice-reflected light of the second polarization to match the other of said polarization components.

BRIEF DESCRIPTION OF THE DRAWINGS

These and other features, aspects, and advantages of the apparatus and methods of the present invention will become better understood with regard to the following description, appended claims, and accompanying drawings where:

FIG. 1b illustrates a graph of the intensity level of light across the lens of the optical system of FIG. 1a.

FIG. 2b illustrates a graph of the intensity level of light across the lens of the optical system of FIG. 2a.

FIG. 3b illustrates a graph of the intensity level of light across the lens of the optical system of FIG. 3a.

FIG. 4b illustrates a graph of the intensity level of light across the lens of the optical system of FIG. 4a.

FIG. 8a illustrates a fourth embodiment of an optical system of the present invention having two light sources.

FIG. 8c illustrates components of the embodiment of FIG. 8a.

DETAILED DESCRIPTION OF THE INVENTION

Figure 1A:
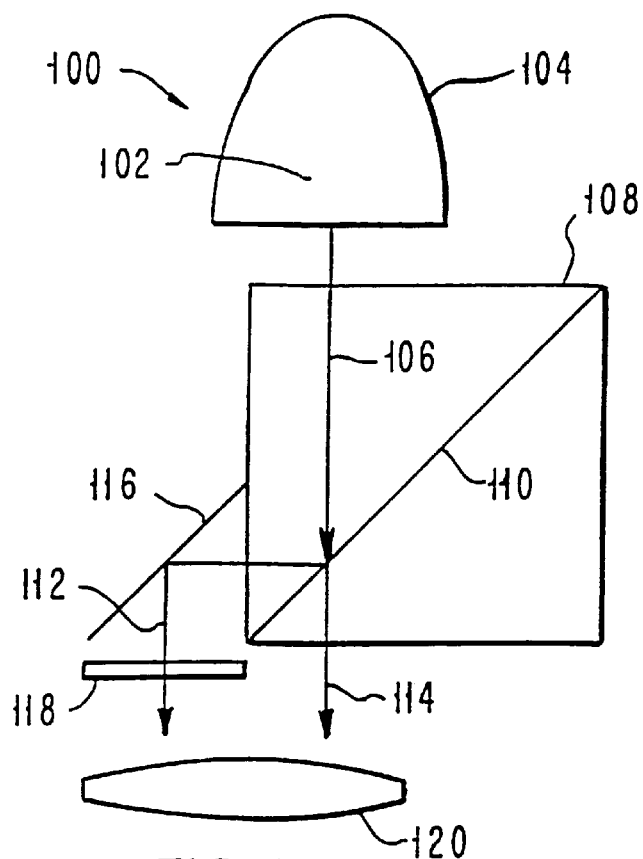
FIG. 1a illustrates a schematic of a prior art optical system for increasing source brightness from a single light source.
Figure 1B:
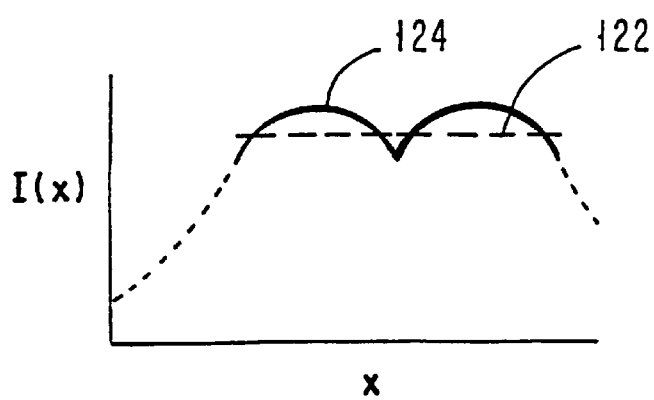

Referring now to FIGS. 3a–3d, there is illustrated a first embodiment of an illumination apparatus of the present invention, generally referred to by reference numeral 300. Illumination apparatus 300 is an embodiment of the present invention appropriate to optical systems that use unpolarized light. Unpolarized beams from first and second light sources 302, 304 respectively, are combined into a single output beam 306 that is also in the unpolarized state. Light sources 302 and 304 are driven with an average power that is equal, for example, to the maximum rated power of the light sources. For example, with metal halide light sources used in a projection display, this maximum power might be 250 Watts. However, power supplies 308 and 310 actually cycle the light sources 302, 304 between operation at 2× instantaneous power, such as 500 Watts, and a powered-off condition where the light sources 302, 304 draw almost no power. The duration of each cycle is preferably short compared to the thermal time constants (for example ~0.1 sec.) of the electrode structure of the light sources in order to ensure that the electrodes do not overheat during the high power phase and that they do not cool sufficiently during the power-off phase to precipitate out the mercury and metal halide additives in the light source, thus ensuring that redischarge takes place when the next high power cycle begins. Color sequential projectors incorporating one lightvalve and three light sources [red, green, and blue] in which a balance between red, green, and blue is achieved by driving each light source at an adjusted high level only when its color is being displayed, leaving it off otherwise are known in the art. In such a projector, the time average power to the AC light source is held constant, and the power in positive pulses kept equal to the power in negative pulses. If the illumination apparatus 300 of the present invention is used in such a projection display it is convenient to modulate light sources 302, 304 at the refresh rate of the display, which is commonly 60 Hz. A further step for ensuring redischarge is to keep the light sources 302, 304 running at low power between high power cycles instead of turning them completely off, so as to maintain ionization in the gas. Both light sources 302, 304 can be preferably warmed up for a short time, such as 15 seconds, when the system is first turned on by powering them steadily at moderate power before commencing time-modulated operation. If the light sources 302, 304 are designed to be run AC, successive high pulses should be of opposite polarity. During the high phase the instantaneous current is larger than nominal, and must be carefully regulated. It is also known in the art that current can be controlled by driving a light source with very short bursts of pulses, each pulse in a burst lasting for about 0.1 milliseconds, with a significantly longer interval between bursts. Alternatively, rather than driving the light sources 302, 304 of the present invention at a uniform 2× voltage during its powered-on phase, one can instead drive it with a succession of 4× pulses spaced apart by 0.1 msec, and of 0.1 msec duration. The shape of the driving waveform can be adjusted as necessary to facilitate re-ignition, and maintain electrode lifetime. For example, the arc position of the light sources 302, 304 can be stabilized by modulating the driving waveform (left on at low amplitude between bursts) with a period of about 0.03 msec.

Figure 3A:
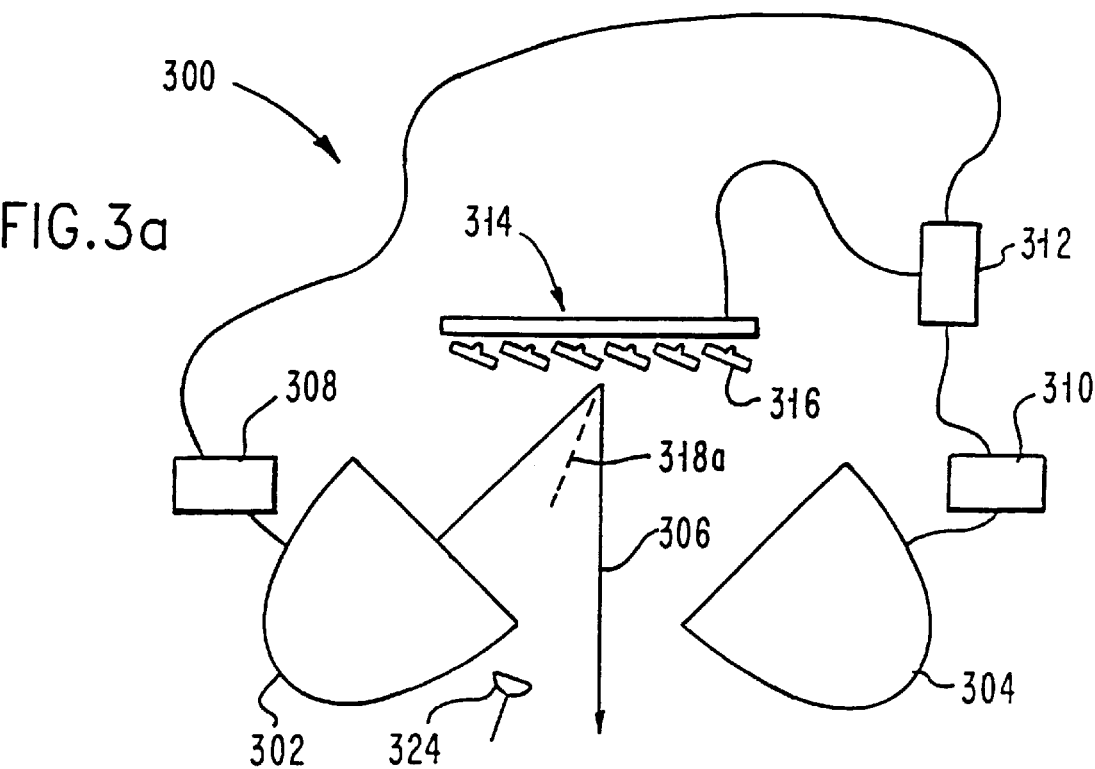
FIG. 3a illustrates a schematic of a first embodiment of an optical system of the present invention having two light sources in which the first light source is powered and the second light source is substantially unpowered.
Figure 3B:
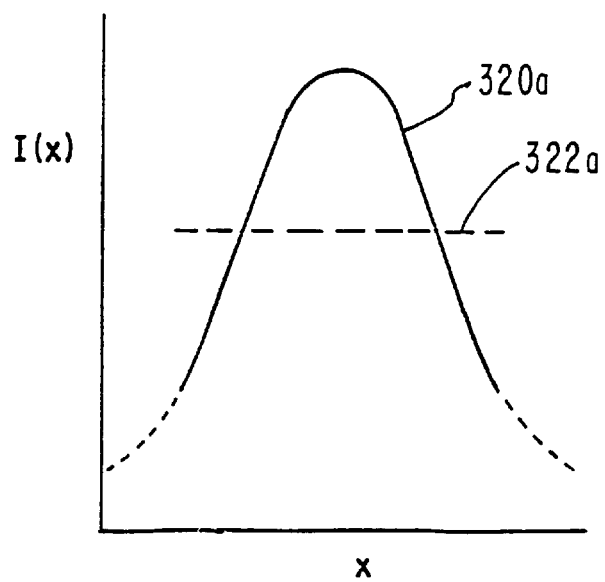
Figure 3C:
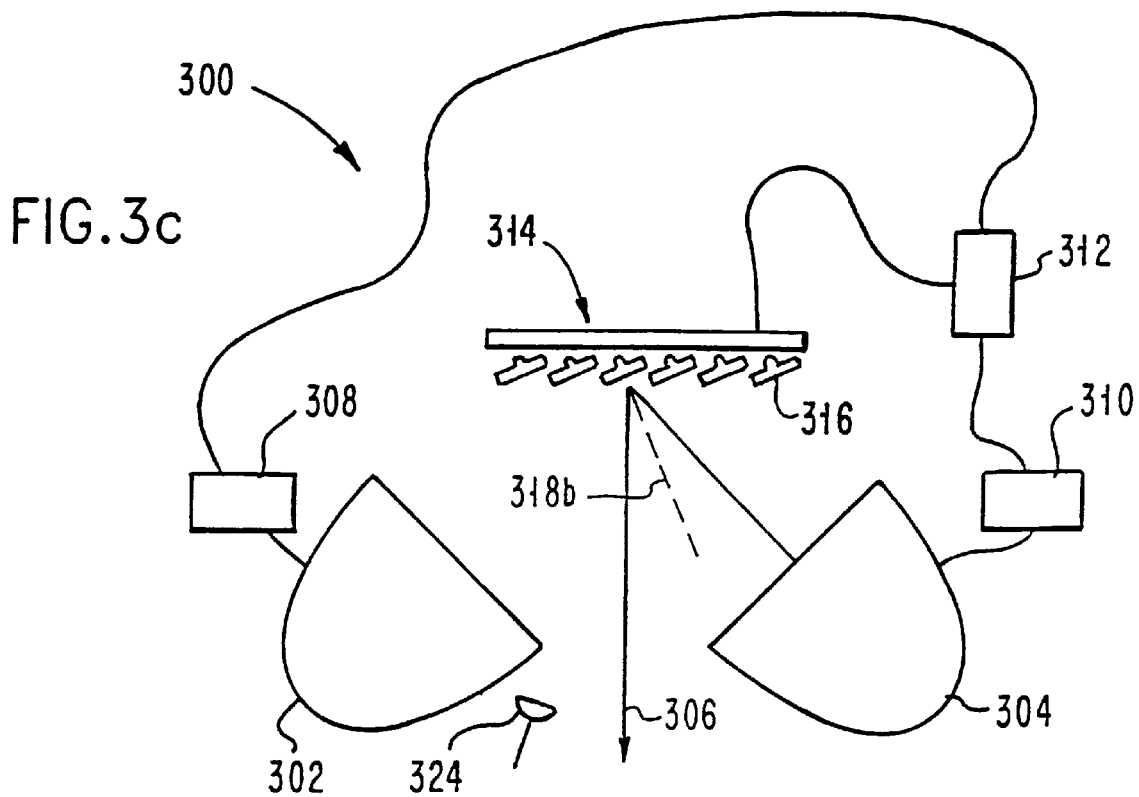
FIG. 3c illustrates a schematic of the first embodiment of an optical system of the present invention having two light sources in which the second light source is powered and the first light source is substantially unpowered.
Figure 3D:
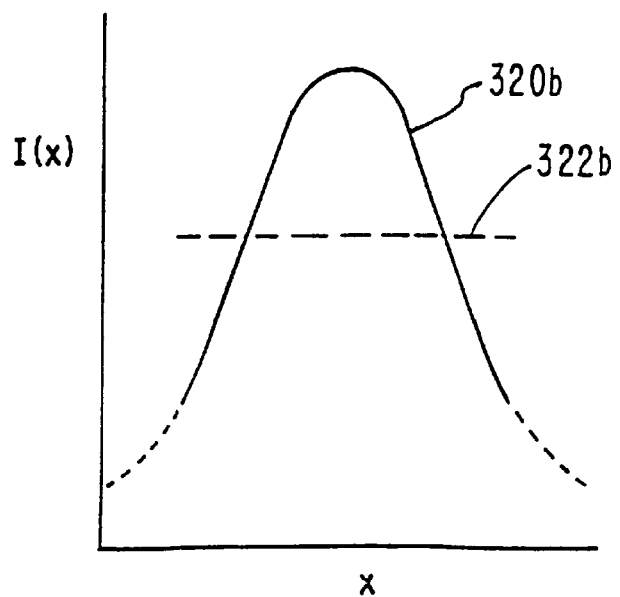
FIG. 3d illustrates a graph of the intensity level of light across the lens of the optical system of FIG. 3c.

Controller 312 runs light sources 302, 304 out of phase with one another, so that light source 304 is off when light source 302 is on, as shown in FIG. 3*a*, and light source 302 is off when light source 304 is on, as shown in FIG. 3*c*. Controller 312 also runs beam combiner 314 in synchronism with light sources 302, 304. Beam combiner 314 is preferably a digital mirror device (DMD), consisting of an array of mirrors 316 which are switched back and forth between first and second tilted positions. Such devices are available commercially from Texas Instruments Inc. (TI) and typically include electronics for individually addressing mirrors 316, and for driving them in a time sliced fashion so that they spend an adjustable fraction of each $\frac{1}{60}$th second video frame in one of the first or second tilt positions compared to the other tilt position. To accommodate this time slicing, the mirrors 316 in the DMD 314 can be switched in microseconds. TI DMDs 314 are used as light valves with high pixel count, so the mirrors 316 can be quite small (17 microns). Small size is important for those applications where the DMD 314 must be switched in microseconds. However, none of this functionality is necessary for the present invention. Controller 312 simply switches all the mirrors 316 together in synchronism with the light sources 302, 304 output. When light source 302 is on, as shown in FIG. 3*a*, the mirrors 316 are tilted at angle $\theta$ towards light source 302, such as 10 degrees (by way of example only). Light source 302 is preferably tilted at twice this angle, e.g. 20 degrees, so that the mirrors 316 reflect the light source output into beam 306 that is perpendicular to the substrate of combiner 314. The tilt angle $\theta$ of the mirrors 316 is chosen large enough that all rays from light source 302 are incident on combiner 314 from the same side of the normal direction 318*a* (318*b* in FIG. 3*c*) to the mirrors 316. The tilt angle $\alpha$ of the light sources 302, 304 is preferably chosen to be twice the mirror angle $\theta$. Because light source 302 is driven at 2× instantaneous power during this portion of the cycle, the instantaneous intensity of beam 306 is double that which would be obtained if light source 302 were driven at a constant level equal to the maximum allowable time averaged power. This is illustrated schematically by curve 320*a* in FIG. 3*b* where the length of dotted line 322*a* represents the diameter of the lens used (not shown).

During the next video frame, light source 304 is switched on, light source 302 is switched off, and mirrors 316 are tilted in the opposite direction, as shown in FIG. 3*b*. A simple way to improve efficiency is to ensure that the mirrors 316 can switch in a time short compared to the duration of the video frame, though if such fast switching is not achieved, compensation can be made by adjusting the light source modulation (see below). For millisecond switching speeds, the mirrors 316 can be coarser than the 17 microns in TI's DMD 314. In the switched position shown in FIG. 3*b*, mirrors 316 now direct the output of light source 304 into the common output beam 306 direction. Output beam 306 continues to have twice the intensity that these light sources 302, 304 could ordinarily provide as shown by lines 320*a*, and 320*b* in the intensity graphs illustrated in FIGS. 3*b* and 3*d*, respectively. However, the width and angular divergence of the output beam 306 are only slightly larger than that from a single source. Light sources 302, 304 are each preferably driven at the maximum allowable power, as measured over intervals comparable to the thermal time constant of their electrode structure. Light source power exceeds the steady-state operating limit only on time scales shorter than about 100 msec, and preferably not longer then the video frame time, such as about 15 msec.

If light sources 302, 304 do not have precisely equal voltage responses, the signal initially received by detector 324 will be time varying. This signal can be used to balance the light sources 302, 304 driving voltages. Alternatively, light sources 302, 304 can be driven at a sufficiently high rate, for example at double the video frame rate, that any modulation in the output beam 306 is imperceptible.

Figure 1C:
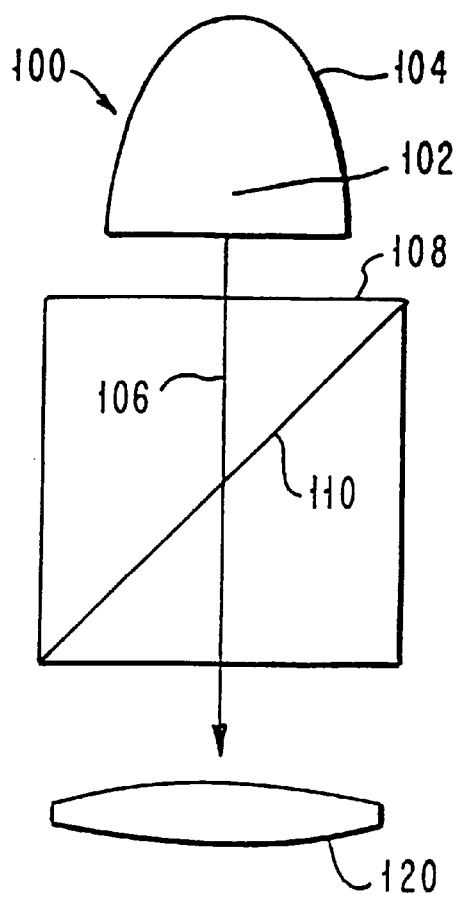
FIG. 1c illustrates a schematic of a prior art optical system having a single light source.
Figure 1D:
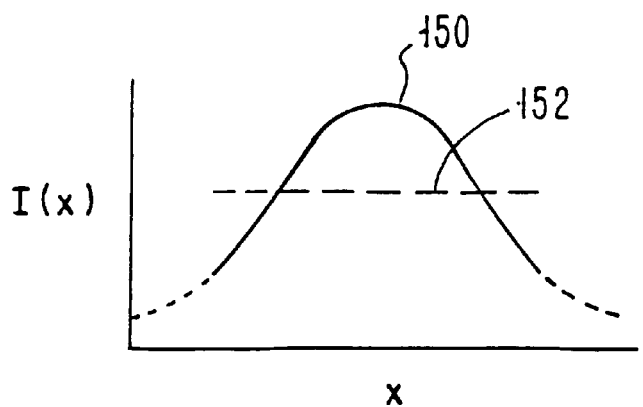
FIG. 1d illustrates a graph of the intensity level of light across the lens of the optical system of FIG. 1c.
Figure 2A:
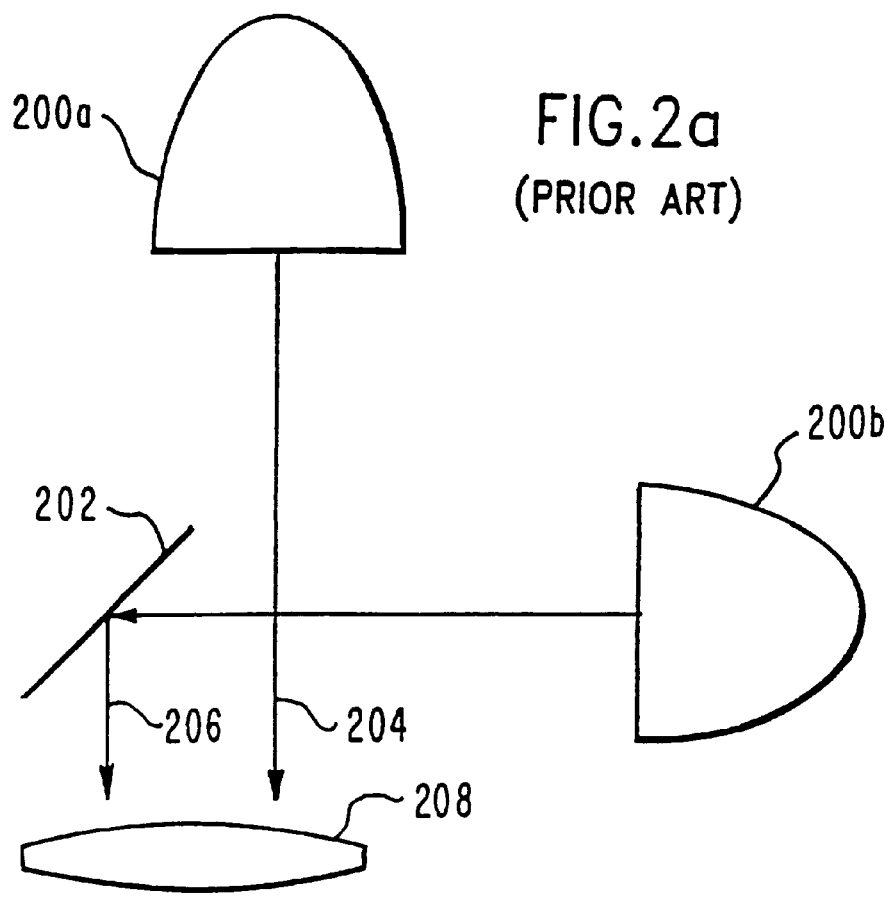
FIG. 2a illustrates a schematic of a prior art optical system for increasing source brightness using two light sources.
Figure 2B:
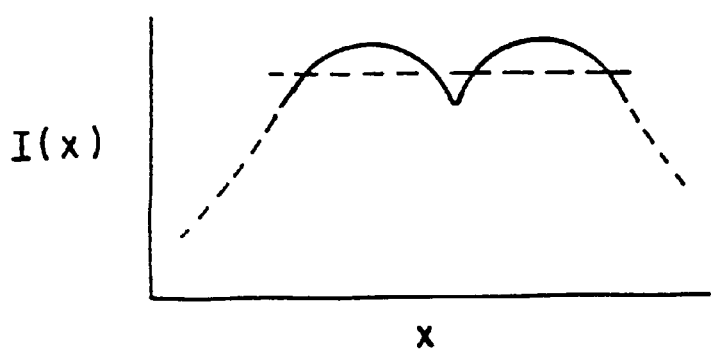
Figure 2C:
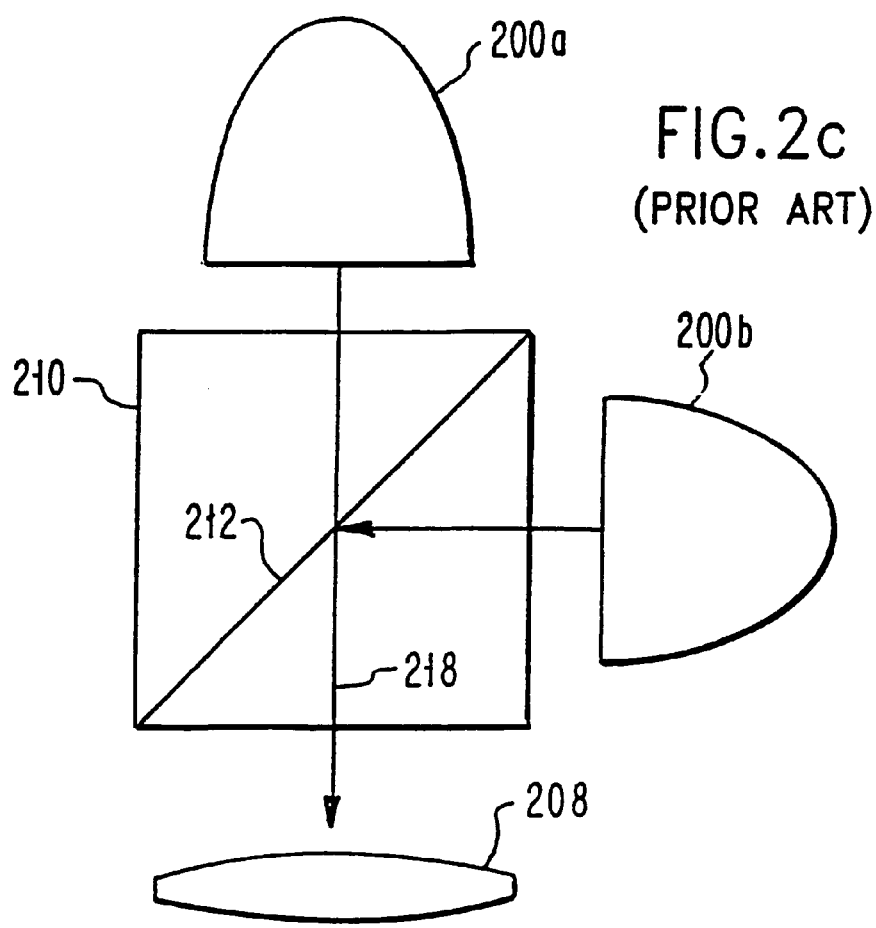
FIG. 2c illustrates a schematic of another prior art optical system for increasing source brightness using two light sources.
Figure 2D:
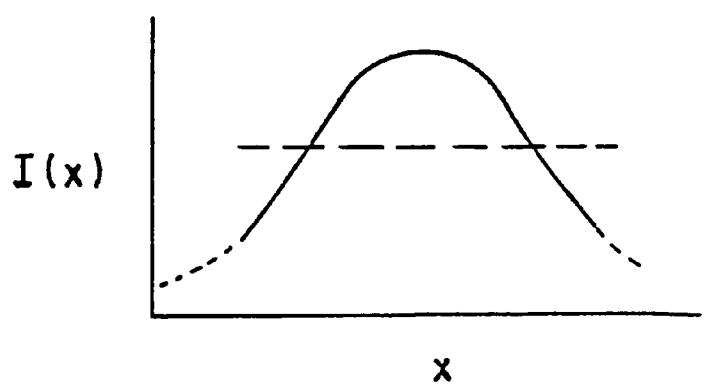
FIG. 2d illustrates a graph of the intensity level of light across the lens of the optical system of FIG. 2c.

Referring now to FIGS. 4*a*–4*d*, there is illustrated a second embodiment of the illumination apparatus of the present invention, generally referred to by reference numeral 400. Modulator 314 in the first embodiment shown in FIGS. 3a–3d may only be available "off-the-shelf" if purchased as a DMD lightvalve. In this case it will likely contain sophisticated functionality not needed for the present application, as noted above. FIGS. 4a–4d show an embodiment of the present invention for applications requiring polarized light in which components optimized for the present application are readily obtainable. During the first video frame, and succeeding odd frames, shown in FIG. 4a, controller 402 drives first light source 404 at 2× instantaneous power via supply 406. During odd cycles second light source 408 is either off or operated at minimum intensity. The peak brightness region of the P polarized component of the first light source 404 is transmitted by polarizing coating 410 as beam 412. The peak brightness S component is reflected by coating 410 and folded by mirror 414 to form beam 416. Static retarder 418 rotates the polarization of beam 416 to the same P state as beam 412. The asymmetric alignment of the first light source 404 and mirror 414 relative to beam-splitter 420 allows lens 422 to collect the high brightness "hot spots" of beams 416 and 412. However, the instantaneous intensity of the beam collected by lens 422 is twice as high as that collected by lens 120 in FIGS. 1a and 1c, because the first light source 404 is operated at 2× higher power during its "on-phase" in the 50% duty cycle.

Figure 4A:
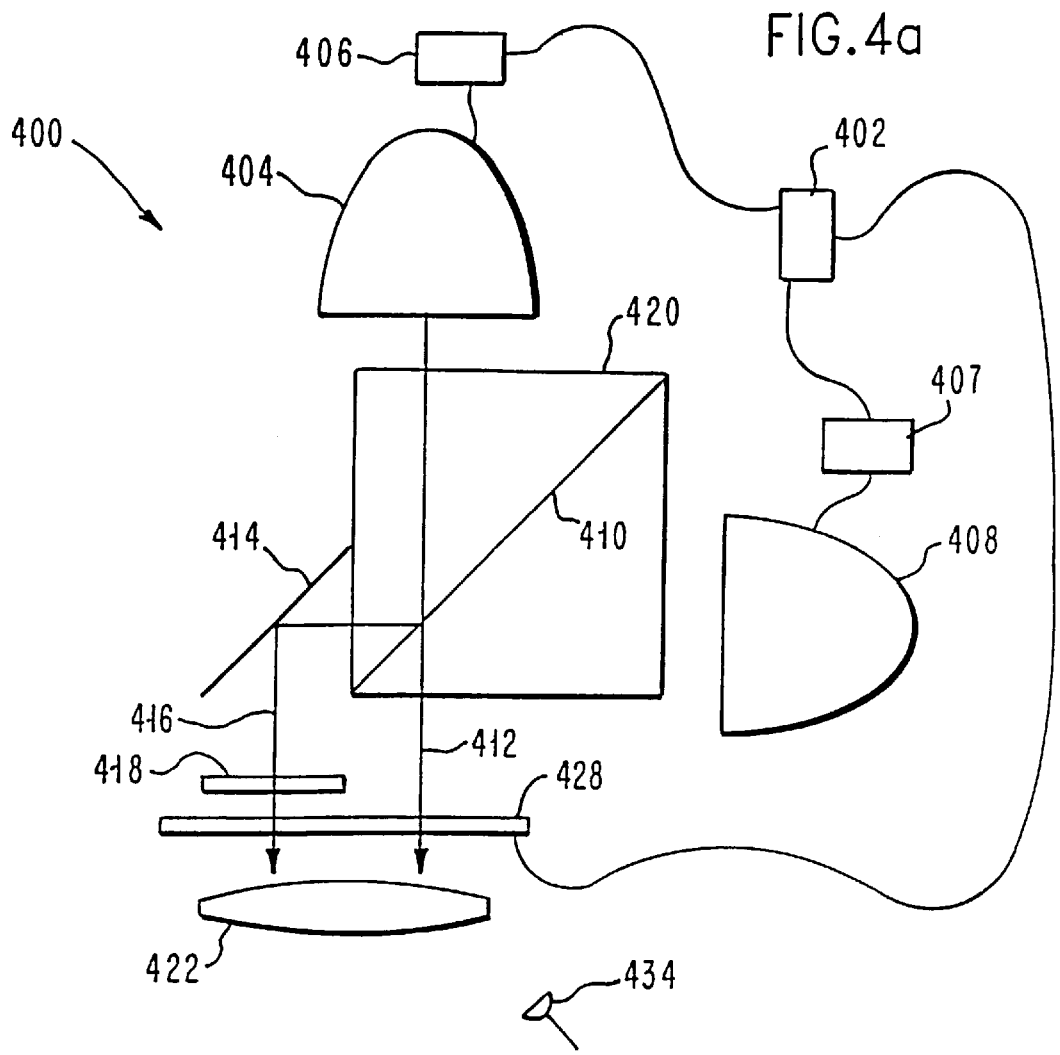
FIG. 4a illustrates a schematic of a second embodiment of an optical system of the present invention having two light sources in which the first light source is powered and the second light source is substantially unpowered.
Figure 4B:
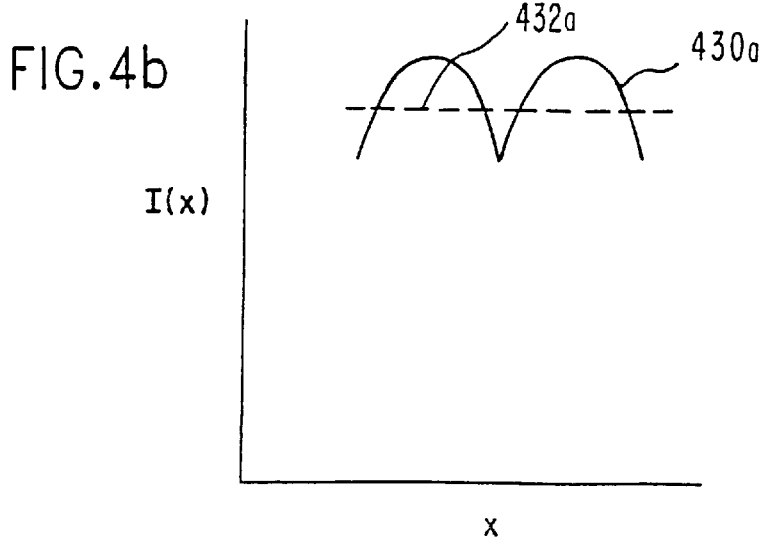
Figure 4C:
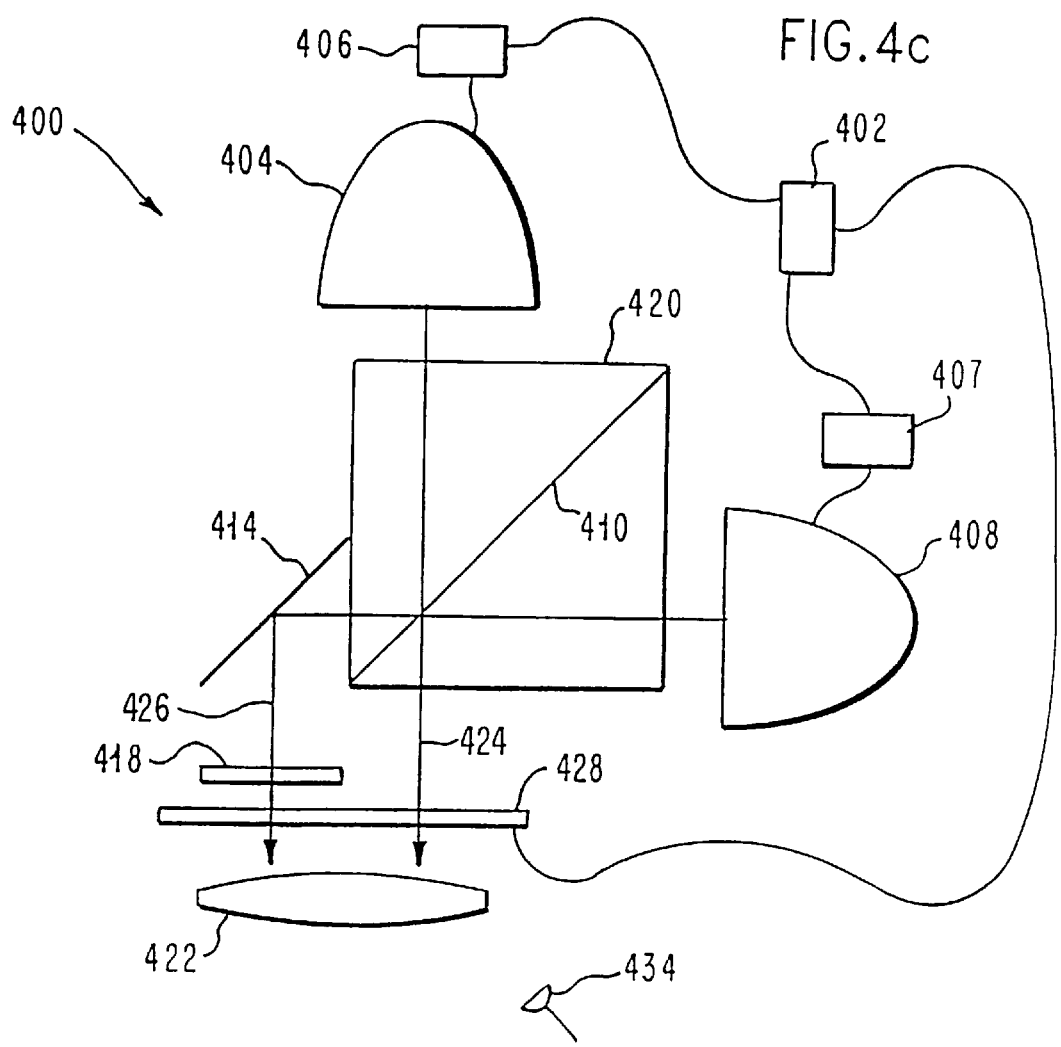
FIG. 4c illustrates a schematic of the second embodiment of an optical system of the present invention having two light sources in which the second light source is powered and the first light source is substantially unpowered.
Figure 4D:
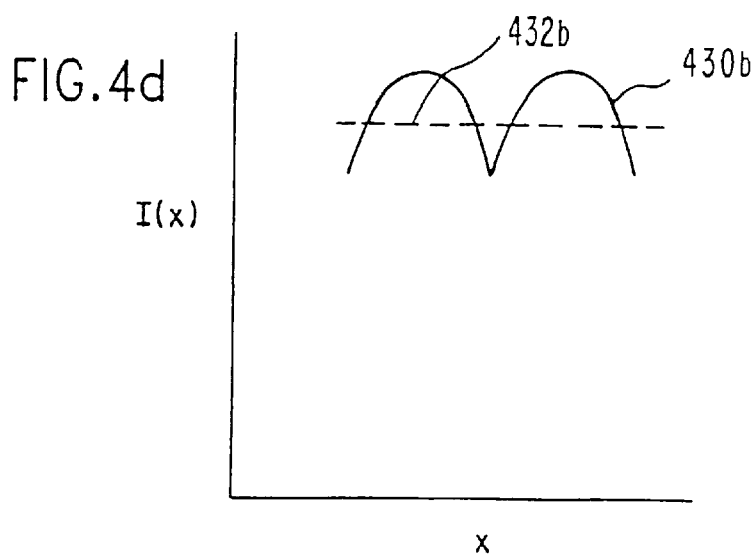
FIG. 4d illustrates a graph of the intensity level of light across the lens of the optical system of FIG. 4c.

During the other half of the duty cycle, corresponding to the even video frames and shown in FIG. 4c, the first light source 404 is substantially off while the second light source 408 is operated at 2× intensity by controller 402 via power supply 407. Coating 410 now causes beam 424 to be S polarized, since the beam is now incident from the second light source 408 in reflection. Beam 426 is likewise S polarized after exiting retarder 418. However, during the even frames controller 402 switches on modulator 428, so that the output beams 424, 426 are rotated to P state. During the odd frames, when beams 412 and 416 are P polarized as described above, modulator 428 is switched off, leaving the output beams 412, 416 in P state for the odd frames as well.

Thus, a continuous P polarized beam of 2× intensity is produced. Alternatively, a continuous S output can be produced by reversing the phase of modulator 428, or by moving static rotator 418 from beam 416 to beam 412.

As with the previous embodiment, if light sources 404, 408 do not have precisely equal voltage responses, the signal initially received by detector 434 will be time varying. This signal can be used to balance the light sources 404, 408 driving voltages. Alternatively, light sources 404, 408 can be driven at a sufficiently high rate, for example at double the video frame rate, that any modulation in the output beams 412, 418 or 424, 426 is imperceptible.

The terms "on" and "off" in reference to modulator 428 merely distinguish the action of the modulator in rotating the output polarization. In the "off" state modulator 428 leaves the polarization nominally unrotated; in this state the polarization might actually be rotated 180° without affecting the operation of the invention. In the "on" state modulator 428 rotates the polarization 90°. Modulators to rotate the polarization 180° or 0° ("off"), or 90° ("on") can be based on liquid crystal (LC) effects, such as the tunable birefringence effect, the wave-guide effect, and the surface-stabilized ferroelectric liquid crystal (FLC) effect, each of which is next described.

The Tunable Birefringence Effect

Two forms of the tunable birefringence effect can be used, the homogeneous (or parallel aligned) LC cell and the Π-cell. In either case, the modulator 428 is a cell containing nematic LC medium between two electrodes for switching, and in both cases the LC directors adjacent to the cell substrates have a small pretilt angle from the substrate plane. In Π-cells the LC directors are aligned to have a reflection symmetry with respect to the central plane of the LC cell. The LC directors in the homogeneous LC cell are parallel to each other in the quiescent state. In both cells the nematic LC mixtures have positive dielectric an isotropy, so that by changing the applied voltage across the cells the retardance can be tuned from an initial value of $2\Pi d\Delta n/\lambda$ to almost zero, where d, $\Delta n$, and $\lambda$ are the cell gap, effective birefringence, and wavelength of the incident light, respectively. As long as $2\Pi d\Delta n/\lambda > 1$ there will always exist two switchable states in which the input polarization is rotated by 90° in one and 180° in the other.

The Wave-Guide Effect

A 90° twisted nematic (TN) LC cell can be used to build the modulator 428 based on the wave-guide effect. In a 90° TN cell the directors twist 90° from one cell substrate to the other. The input polarization will be rotated 90° in the voltage-off state if the input polarization is parallel (or perpendicular) to the LC directors near the entrance surface, and if $d\Delta n/\lambda$ is set equal to $\sqrt{n^2 - 0.25}$, where n is an integer. The other (almost) unrotated state is achieved by applying a large enough voltage to the cell that most of the LC directors are aligned parallel to the electric field, eliminating the wave-guide effect.

The Surface-Stabilized FLC Effect

A surface-stabilized ferroelectric LC cell can also be used to rotate the input polarization by 90° or 0°. The directors in the FLC cell have two stable positions, switchable by applied electric field. One of the stable positions can be set parallel to the input polarization, so polarization is not rotated when the cell is switched to this state. If $d\Delta n/\lambda$ is set to 0.5, the FLC cell becomes a halfwave retarder. When switched to the second stable state the retarder axes rotate through an angle $2\beta$, where $\beta$ is the so-called half-cone-angle of the FLC molecule. If $\beta = 22.5°$, the polarization is rotated 90° when the cell is switched to the second state.

These modulators 428 provide switching times in approximately the millisecond regime. This is fairly short compared to the 17 msec frame duration of a display operated at 60 Hz. However, if the modulator 428 is in transition during part of the time that a light source is pulsed high, some portion of the output beams 412, 416 or 424, 426 will briefly be switched by the modulator 428 to the wrong polarization. Projection systems usually have a supplementary polarizer to trim small background components in the wrong polarization, but the trimmed light nonetheless represents wasted power. To improve efficiency, each source can be pulsed high with a duty cycle slightly lower that 50%. For example, if the modulator has a 1 msec switching time, then in two successive cycles lasting a total of 34 msec, one of the first or second light sources 404, 408 might be pulsed high between 0.5 and 16.5 msec, and the other light source between 17.5 and 33.5 msec. In order to run the light sources 404, 408 at nominal rated power in the time-average, the instantaneous power should be increased by 2.12×, instead of the 2× increase that applies with a simple 50% duty cycle. While it is important that the time-averaged power not exceed the nominal rating, with some light sources 404, 408 it is also desirable that the time-averaged power not be substantially lower than the nominal rating; i.e. the power level in some light sources must be held fairly close to nominal.

When the above conditions are met, the embodiment of FIGS. 4a–4d provides an approximately 2× brighter beam than the prior art arrangement of FIGS. 1a–1d. However, the beam it provides is not fully optimized in its brightness distribution. Mirror 414 and retarder 418 do provide some improvement in the brightness distribution beyond that of the raw beam emitted from the light sources 404, 408, because in the embodiment of FIGS. 4a–4d, lens 422 is able to collect from the raw beam two zones of high brightness, as illustrated in graphs 430a and 430b in FIGS. 4b and 4d, respectively. However, further improvement is possible; it is possible to increase the inhomogeneity of the beam, making the brightness of the central hot spots more pronounced, by focusing the light onto the region of coating 410, mirror 414, and lens 422, i.e. focusing the light onto the region where the beam is truncated. Of course, the simple "zero-order" light concentration provided by focusing does not improve brightness. Since brightness refers to projected optical power per unit solid angle per unit projected source area, the basic action of focusing, namely to produce a beam that is more concentrated but also proportionately more divergent (or convergent) does not in itself increase brightness. However, with many light sources the detailed shape of the focused beam image will have a more pronounced peak than does the distribution immediately in front of the light source.

Figure 5:
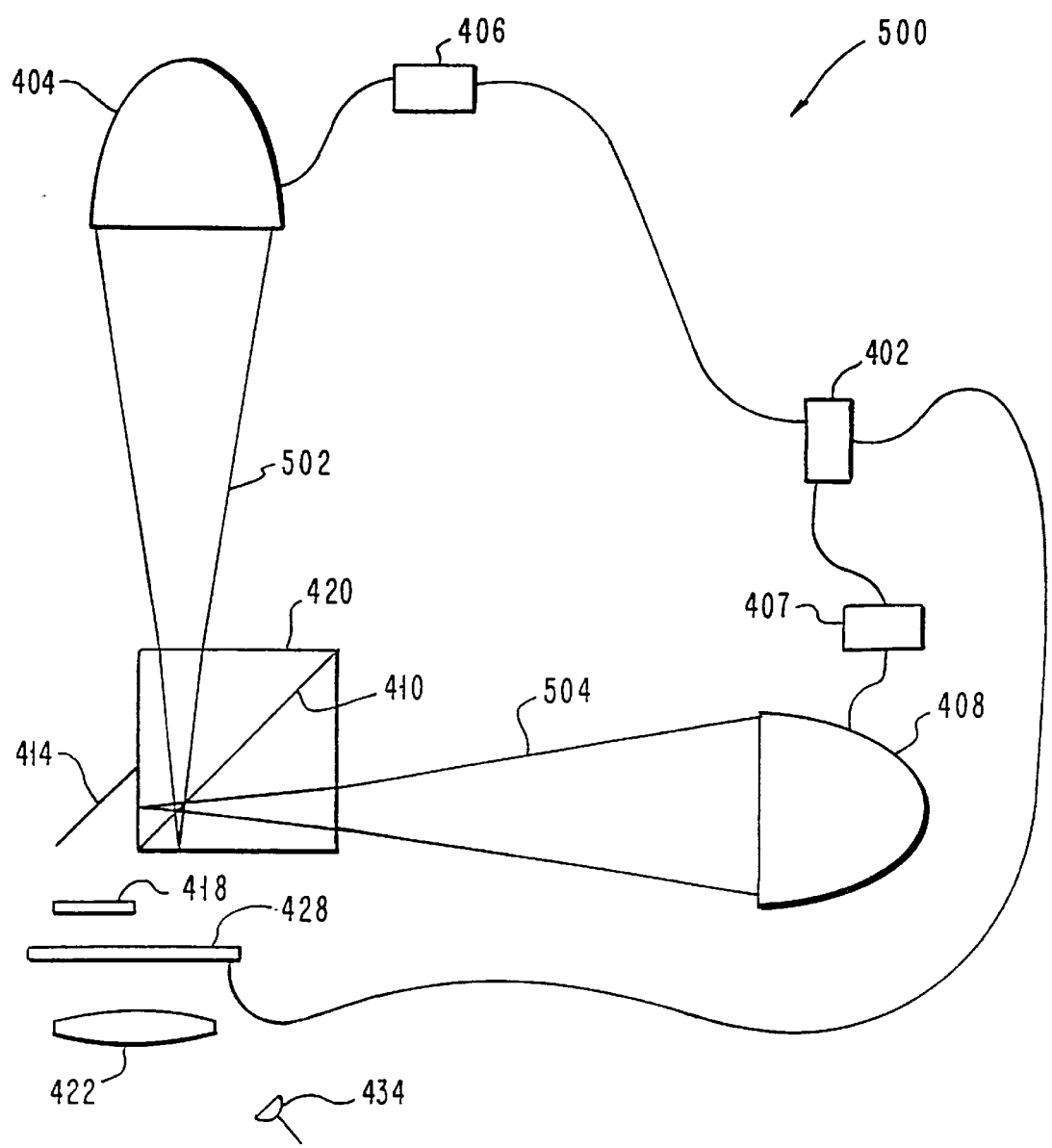
FIG. 5 illustrates a schematic of a third embodiment of an optical system of the present invention having two light sources.

Referring now to FIG. 5, there is illustrated a third embodiment of the illumination apparatus of the present invention, generally referred to by reference numeral 500, in which the same or similar elements are referred to like reference numerals from the previous embodiment. FIG. 5 shows an arrangement in which the brightness of the two hot spots collected by lens 502 is slightly increased over the embodiment shown in FIGS. 4a–4d, because the reflectors of the light sources 404, 408 are made to focus the beams in the vicinity of mirror 414 and lens 422 where the spatial limits of the collected beam are defined. The light sources beams 502, 504 should preferably not be strongly focussed, but instead should be converged with an angle not larger than about +/−10 degrees, since polarizing coating 410 would not typically work well over a larger range. Mirror 414 and lens 422 can be physically smaller than those used in the embodiment of FIGS. 4a–4d,since, for given optical system etendue, the widened angular range of the beam means that the portion collected by the optical system must have a smaller diameter.

Because of the +/−10 degree beam angle limit, the light sources 404, 408 in the FIG. 5 embodiment must be drawn back fairly far from beamsplitter 420. In some cases this can make for an unwieldy optical system. There are known optical arrangements in the art for focusing light sources onto beamsplitters in a compact way, and this is also possible with time-modulated light sources.

Figure 6:
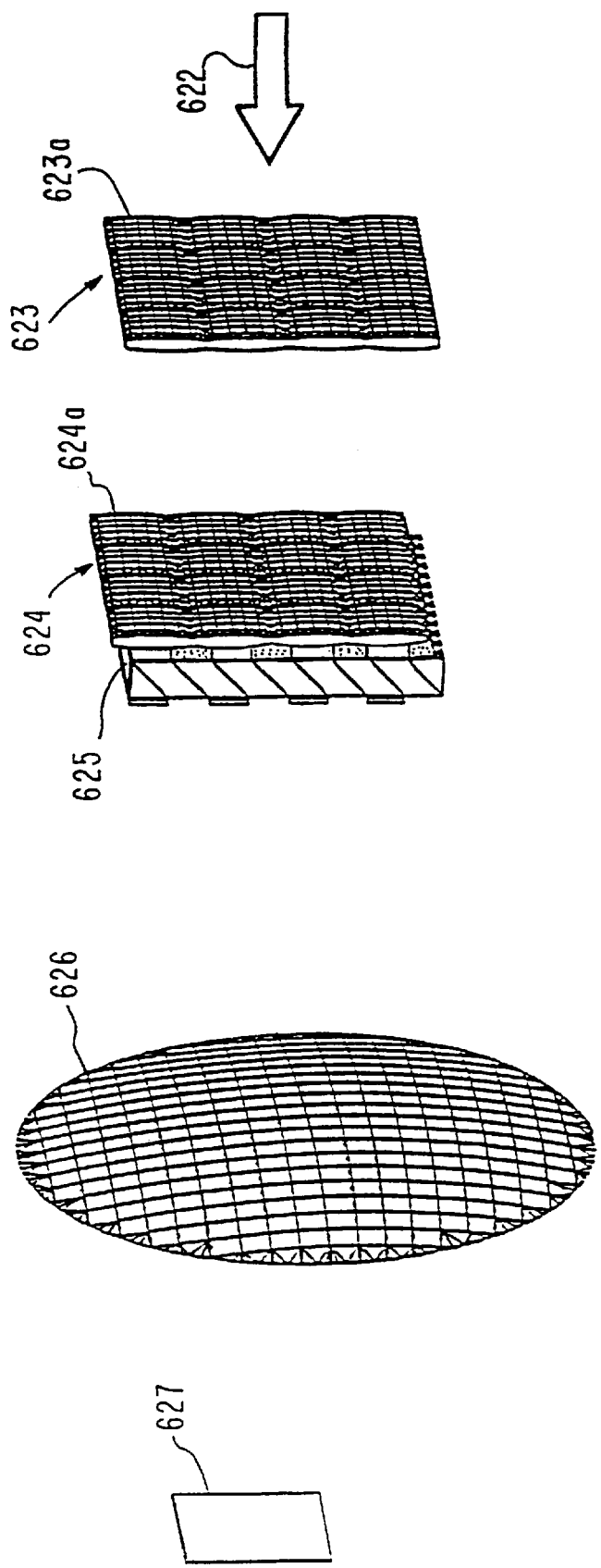
FIG. 6 illustrates an optical system of the prior art.

Referring now to FIG. 6, there is illustrated a prior art optical system in which an incident light beam (shown schematically as arrow 622) is focussed by an array of lenses 623 onto a second array of lenses 624, onto a beamsplitter array 625, then onto a condenser lens 626, and finally projected onto an illumination field 627. Because the individual focussing lenses 623a, 624a are small in diameter, they can focus light into beamsplitter array 625 at the desired small angles without being separated from it by a large distance.

Figure 7A:
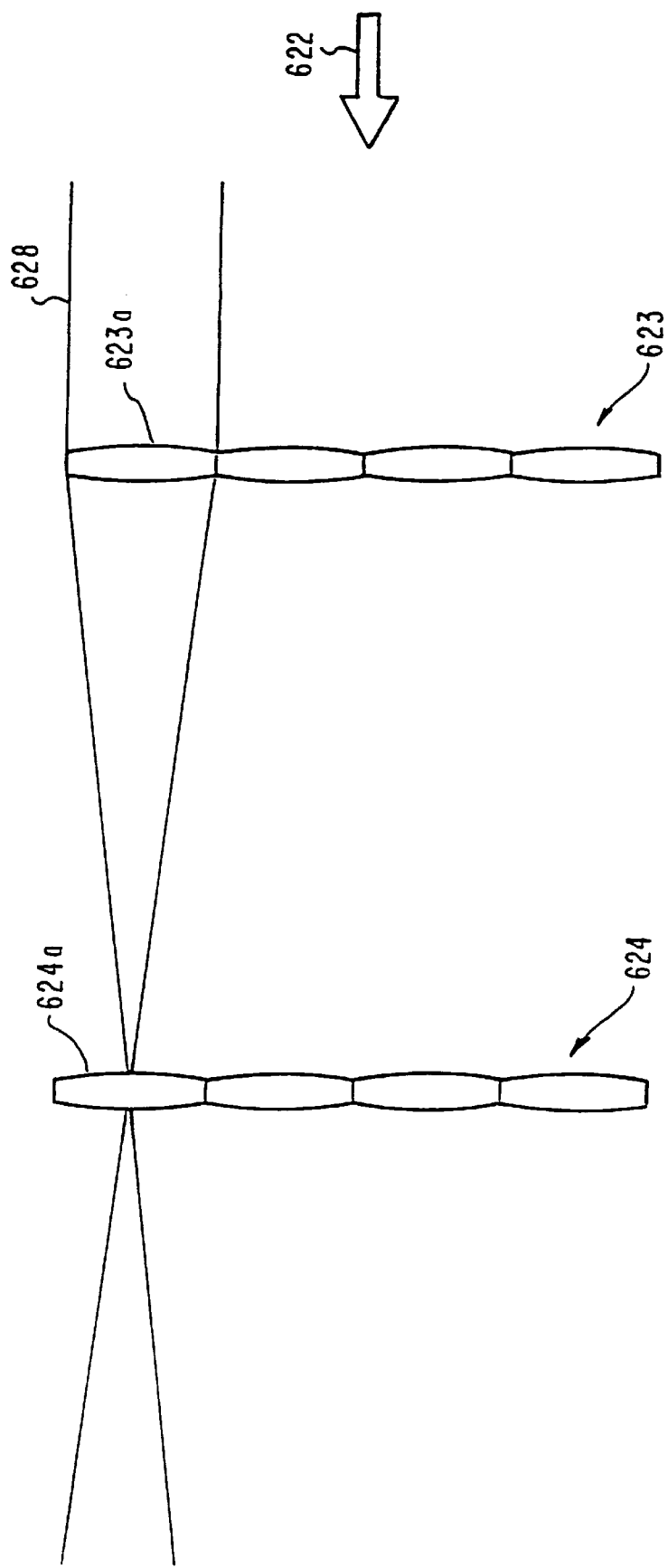
FIGS. 7a–7d illustrate components of the prior art optical system of FIG. 6.
Figure 7B:
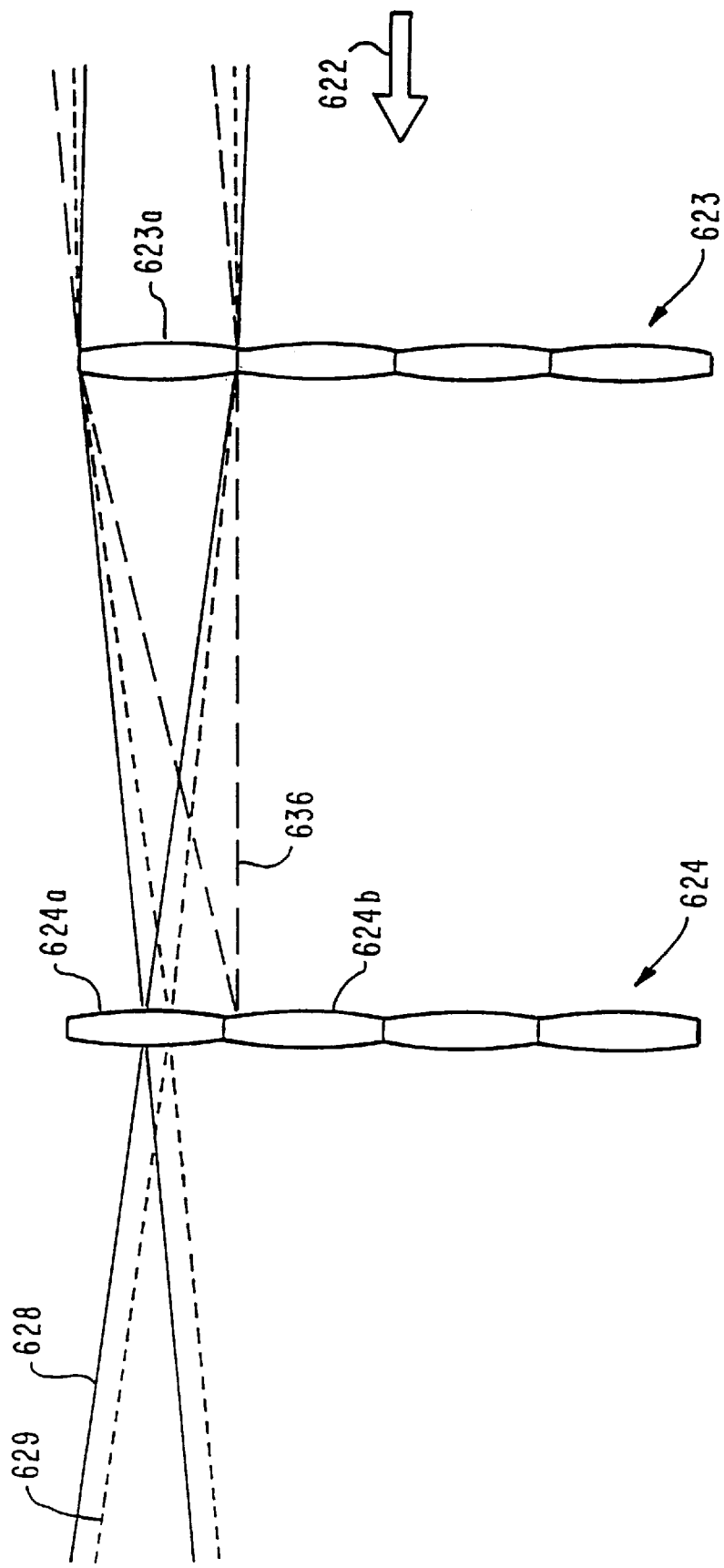

Referring now to FIGS. 7a and 7b, there is illustrated a side view of lens array 623 and second lens array 624. For clarity, beamsplitter array 625 is not shown. Beam 622 is nominally collimated, but because of brightness limitations in the source it will inevitably contain light propagating in a range of angles, for example a +/−2 degree range. FIG. 7a shows how each lenslet 623a in array 623 focusses an image of the source in the vicinity of the corresponding lenslet 624a of array 624, e.g. from lenslet 623a an image is focussed onto lenslet 624a. FIG. 7b shows by dashed lines the behavior of a bundle of rays 629 in nominally collimated beam 622 that is incident on lenslet 623a at an angle, such as 2 degrees. Rays 629 focus to an off-center point in the arc image on lenslet 624a, whereas rays 628 (shown solid) focus at the center of lenslet 624a. Though dashed rays 629 are initially tilted relative to rays 628, the second lenslet 624a refracts bundle 629 into a direction parallel to bundle 628. For this to be accomplished lenslet 624a must be given a focal length substantially equal to the separation between arrays 623 and 624, which is also the approximate focal length of array 623 (if beam 622 is collimated). At the exit (left) side of array 624 all such bundles from matched lenslet 624a are thus rendered parallel. If the light source is reasonably well matched to the collection aperture of the optical system, the illumination will be in the transitional range between the purely power-limited and purely brightness-limited regimes, and the high brightness region of the arc image at lenslet 624a will fill a reasonably large fraction of the lenslet area, such as half or more.

Thus, light of appreciable intensity will be emitted by many points on the output face of array 624, and the light emitted by all such points will consist of cones that are rendered parallel by the lenslets in array 624. These cones will not have a circular cross-section, but will instead have a cross-section corresponding to that of the lenslets 623a in array 623, such as rectangular or square, as shown in perspective in FIG. 6.

Figure 7C:
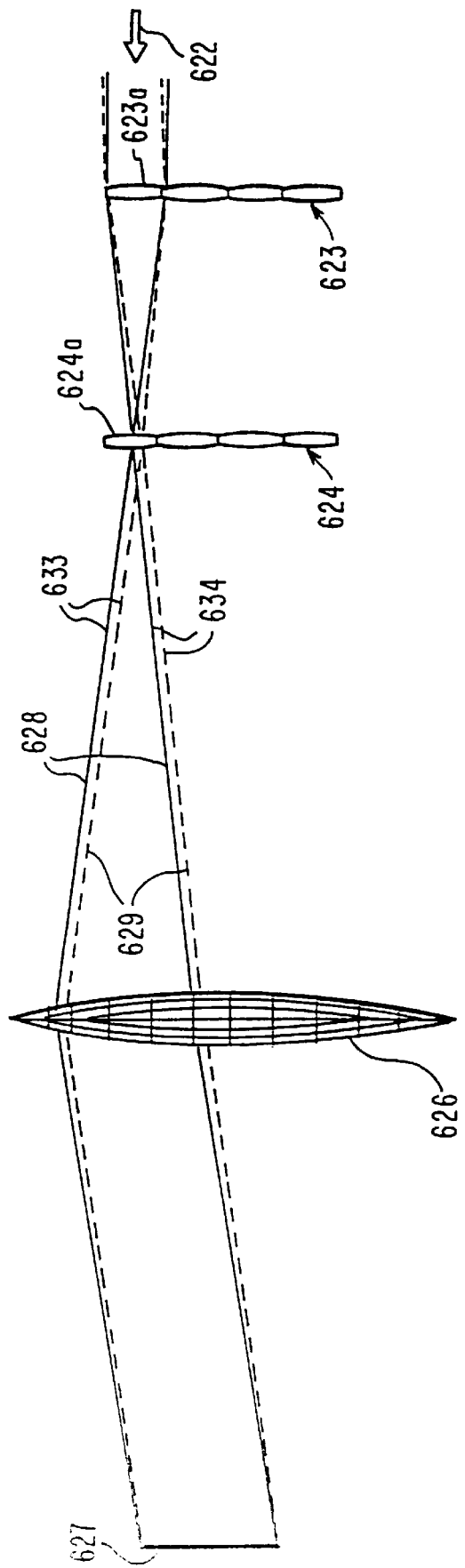

Referring to FIGS. 6 and 7c, illumination field 627 is located at the front focal plane of condenser lens 626, while lenslet array 624 is typically located at approximately the back focal plane. Since the cones of light emitted by condenser 624 are parallel and of common rectangular cross section, the output surface of array 624 can be considered to emit a collection of ray bundles, with each ray bundle composed of parallel rays, and where the parallel rays in a bundle correspond to a particular direction within the common rectangular cross-section of the cones. For example, the rays in cones like 628 and 629 in FIG. 7c can also be divided into parallel bundles, such as the bundle of parallel rays including the pair labeled 633, or the parallel bundle including the pair labeled 634. Each bundle contains parallel rays emitted from substantially every point on array 624.

Since illumination field 627 is at the front focus of condenser 626, any bundle of parallel rays input to lens 626 will be focused to a single point on illumination field 627. Thus, bundles 633 and 634 in FIG. 7c each focus to different points on field 627. Since an input bundle of parallel rays is present for every direction within a cone of rectangular cross section, the collection of focussed illumination points at 627 which are formed from the input bundles will have a matching rectangular cross section. The illuminated field at 627 will thus have the same aspect ratio as the lenslets 623a in array 623. In other words, condenser lens 626 converges the parallel cones of light that diverge from array 624 to a common rectangular overlap at illumination field 627.

If array 624 is approximately at the rear focus of condenser lens 626, the rays within a single cone will be approximately parallel when they are incident from a particular direction on rectangular illumination field 627. The array of source images formed on array 624 will then represent a map of the common set of directions from which light is made to illuminate field 627. Each point on illumination field 627 within the illuminated rectangle receives light from this common set of directions. When every point on field 627 is illuminated from the same set of directions the illumination is termed telecentric; this is often (but not always) desirable. Illumination field 627 should be placed at the front focus of condenser lens 627 to satisfy the basic requirement that the cones be overlapped; if telecentric illumination is also desired, array 624 should be placed approximately at the rear focal plane of condenser lens 626.

If the illumination on field 627 is relayed into a projection system, the range of illuminating directions and the size of rectangular field 627 can be matched to the etendue of the projection optics. If illuminating beam 622 in FIG. 7b is derived from a light source operating in the transitional region between the purely power-limited and purely brightness-limited regimes, then a modest intensity will be present in beams like 636 in FIG. 7b (shown dot-dashed) that enter lenslets like 623a at such steep angles that they are not collected by the matched lenslet, e.g. by lenslet 624a. These cones emerge from a mismatched lenslet 624b of array 624 at such steep angles that they are lost. They therefore represent source light that cannot be collected within the optical system etendue. However, rays from the highest brightness regions of the focussed source images at array 624, such as cones 628 and 629, are collected.

Figure 7D:
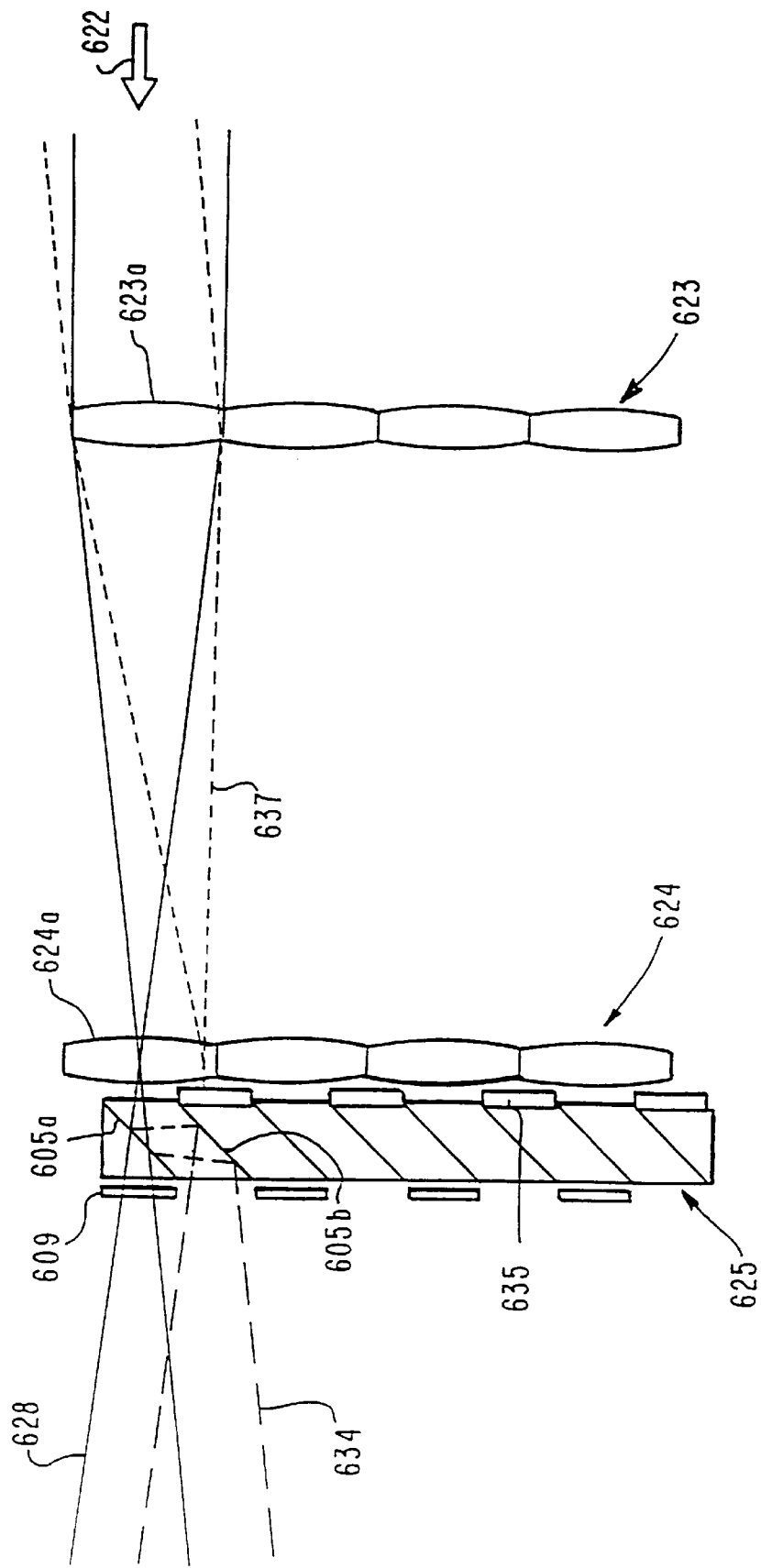

FIG. 7d illustrates the effect of placing beamsplitter array 625 next to array 624. When beams such as 628 enter beamsplitter 625 they strike one of a set of parallel interfaces coated with polarizing filters, such as coating 605a. The P polarized component is transmitted through coating 605a, but is transformed to S polarized light by halfwave retarder 609. The S polarized component of beam 628 is reflected downward by coating 605a, but is reflected again into the forward direction by the adjacent coating 605b. Retarder 609 and adjacent retarders are stripe-like in shape, and the S component bypasses them through the separating space to emerge as S polarized beam 634. Cone 634 has the same rectangular cross section as the directly transmitted cone 628 because coatings 605a and 605b are parallel. Because they share parallel rectangular cross-sections, both the S and the P-converted-to-S components of the input light are focussed to field 627 (as S polarized light). Cone 634 emerges from a slightly different focal plane, giving rise to micro-distortions in the range of directions illuminating field 627, but these are usually of no consequence.

Dimmer cones that emerge from lenslets 624a away from the bright central region, such as cone 637 (shown dotted in FIG. 7d), are blocked by opaque screen 635. If left unblocked, the P component of such light would pass through the space between retarders such as 609 and so would exit as P polarization, no longer matching the S polarization of e.g. beam 628. However, cone 637 is relatively dim, and beamsplitter array 625 essentially substitutes for it the high brightness S component 634 of beam 628. The output therefore consists primarily of rays from the high brightness portion of the input, and these high brightness rays are emphasized by the focussing of the light near array 625. Since the brightness of the beam is almost maximized with a well-matched source, it is not straightforward to increase output power beyond that achieved in the FIG. 6 system.

Figure 8B:
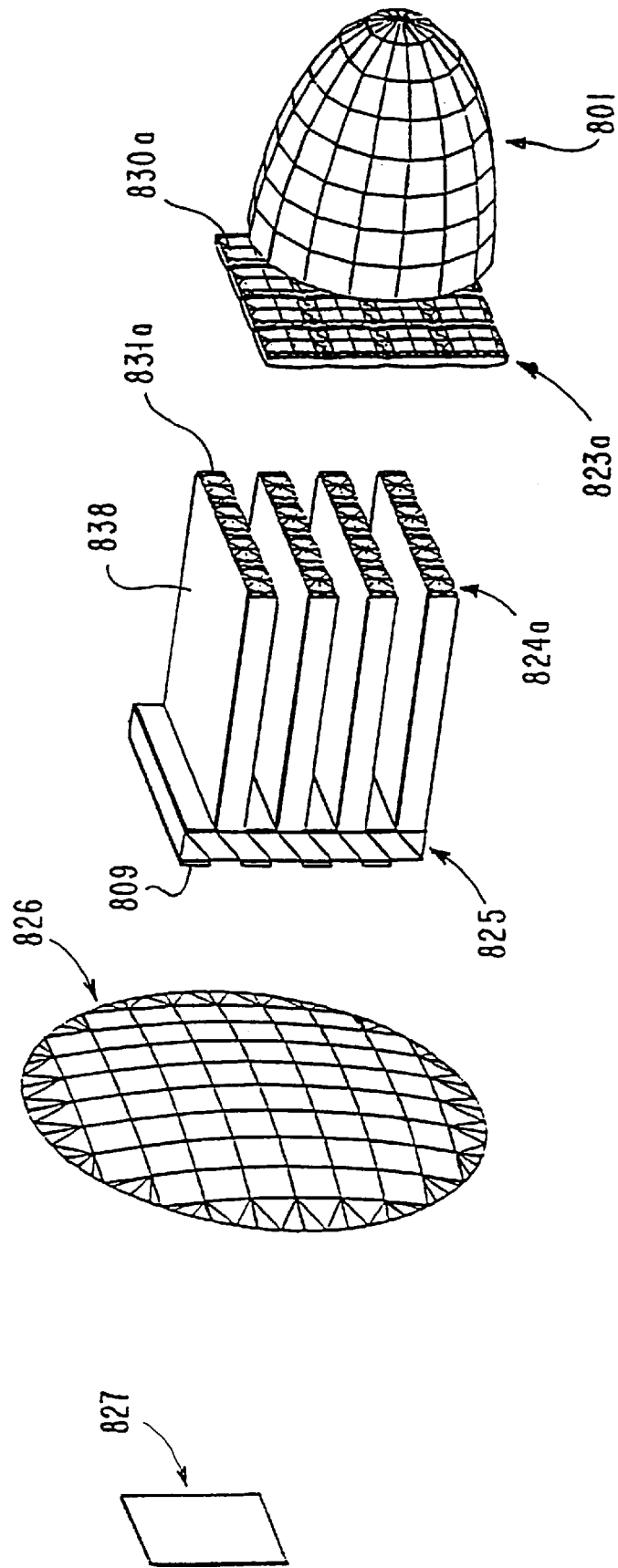
FIG. 8b illustrates a portion of the optical system of FIG. 8a showing the optical path of the first light source.
Figure 8D:
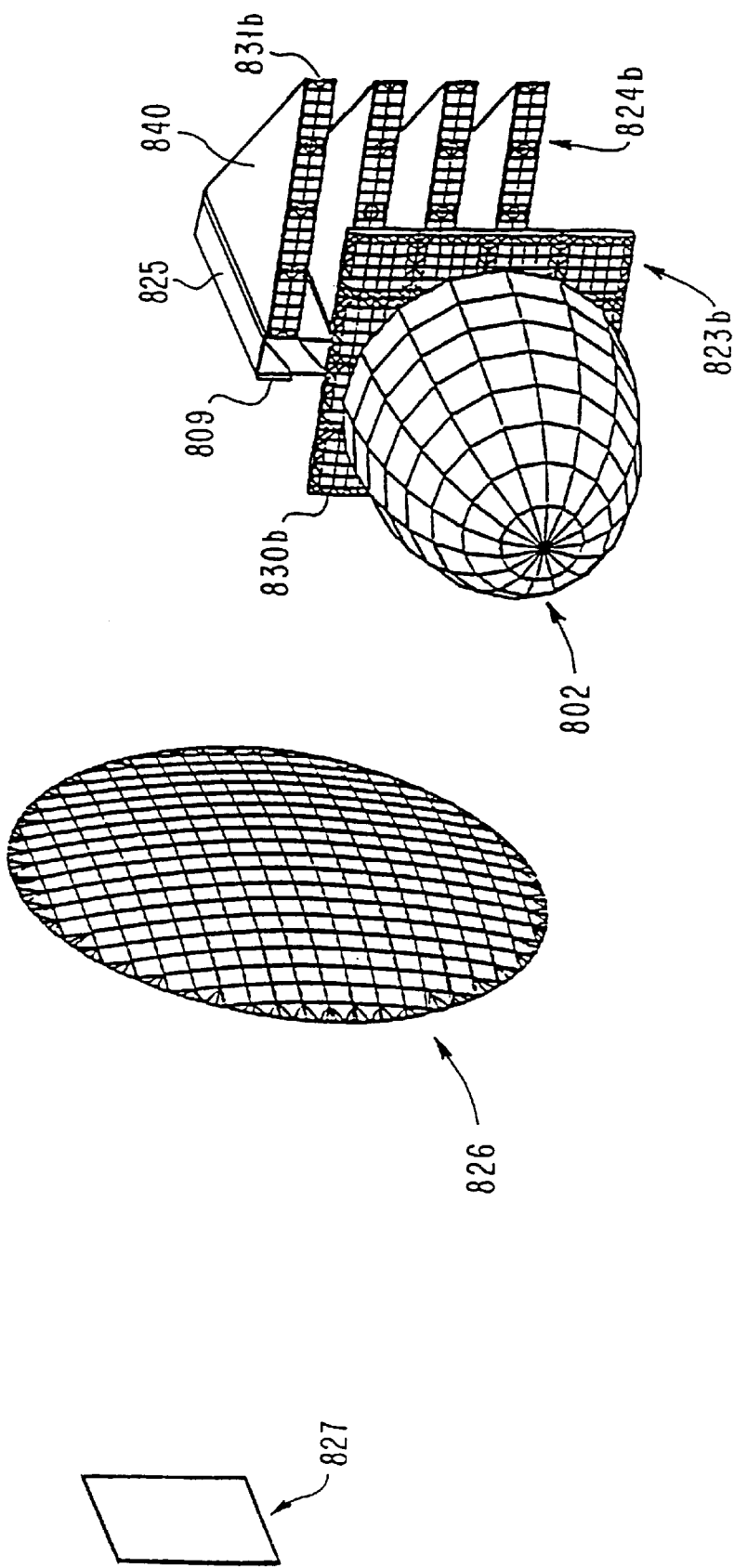
FIG. 8d illustrates a portion of the optical system of FIG. 8a showing the optical path of the second light source.

Referring now to FIGS. 8a–8d, there is illustrated a fourth embodiment of the illumination apparatus of the present invention, generally referred to by reference numeral 800 wherein two time-modulated light sources 801, 802 are utilized to increase beam output power without increasing beam diameter or angular divergence. the operation of illumination apparatus 800 will be clearer from reference to FIGS. 8b and 8d where subsets of the components are shown, primarily those relating to one of the light sources 801 in FIG. 8b, 802 in FIG. 8d. In FIG. 8b light source 801 illuminates lenslet array 823a with a beam that is nominally collimated, but which must nonetheless exhibit non-negligible divergence when a light source achieving useful output power is chosen. The brightest region of the arc images projected by lenslets 830a of array 823a will be received in the central regions of the corresponding lenslets 831a of second array 824a. The lenslets 831a in array 824a are preferably molded into the front surfaces of light guides 538, as shown in FIG. 8b. Lenslets 831a may alternatively be combined into a single element (similar to element 424 shown in FIG. 6). Light guides 838 are solid slabs of optical material, such as glass, contacted at one face to PBS array 825. The thickness of each slab approximately equals the thickness of PBS array 825; retarder strips 809 are also spaced apart by approximately the same distance.

Referring now to FIG. 8c, the light guides 838 and PBS array 825 of illumination apparatus 800 are shown in greater detail. As discussed previously with reference to lenslet 624a of FIG. 7b, light emerges from lenslet 831a as a set of parallel cones. Because these cones are parallel, the total light beam entering light guide 838 will fill a range of directions that is rectangular in cross-section. The aspect ratio of this cone of directions will match the cross-section of lenslets 830a in array 823a of FIGS. 8a and 8b. As discussed further below, this rectangular range of directions would typically subtend of order ±10°. Light guide 838 has plane parallel side faces 838a, 838b, as shown in FIG. 8c. These faces are parallel to the central axis of the rectangular cone of directions that is input to the guide 838, and have the same horizontal and vertical orientations as the edges of lenslet 830a. This means that rays which reflect off the side faces 838a, 838b will continue to be contained within the same rectangular range of directions after reflection, because the image of the rectangular cross-section as mirrored in a side face is still the same rectangle. Moreover, as long as the range of directions is less than ~45°, these rays will undergo total reflection at the side faces 838a, 838b, and no light will be lost out the sides 838a, 838b of the guide 838. The same considerations apply for reflections from the two narrow side faces not visible in the FIG. 8c view.

Light therefore exits guide 838 into PBS 825 with the same rectangular range of directions as it has when it enters guide 838 from lenslet 831a. Rays within the rectangular range that enter guide 838 through a particular point of lenslet 831a, such as cone 839 (shown dotted in FIG. 8c), will continue to subtend this range of directions when they emerge from guide 838, even though, as FIG. 8c shows, they will not generally exit guide 838 through a single common point. Similarly, the rays emitted from a single point at the exit of the guide, such as rays 828, will fill this rectangular cone, even though in general these rays will have entered the guide through different points, i.e. as parts of different cones from lenslet 831a. This is illustrated for rays 828 in FIG. 8c.

Because guides 838 emit parallel cones of light such as 828 that have a common rectangular cross-section, PBS array 825 and lenslet array 824a can carry out much the same function as do adjacent lenslet array 624 and PBS array 625 illustrated in FIGS. 6 and 7, despite the fact that in the FIG. 8c embodiment, the PBS array 825 and lenslet array 824a are separated by guides 838. The P polarized component of beam 828 is transmitted through polarizing coating 805a. It then passes through the space between adjacent retarder elements 809 to emerge as a P polarized beam. The S polarized component of cone 828 is reflected from coated surface 805a as beam 834 (shown dot-dashed in FIG. 8c); it then reflects from the neighboring coating 805b to emerge from PBS array 825 through retarding element 809. Element 809 has substantially halfwave retardance, and so rotates the polarization of beam 834 from S to P. The light from guides 838 therefore emerge from PBS array 825 as a set of parallel cones in P polarization. As illustrated in FIG. 7d, dim portions of the light collected by the lenslets 623a of array 623 are blocked by shields 635 in order to make room for polarization-converted high brightness beams like 634 to be inserted into the output light. In the illumination apparatus 800 of FIG. 8c, these dim input portions are not collected within the thickness of guides 838, but are lost in the spaces 840 between. Similar shields (not shown) can be inserted in the spaces 840 between lenslets 831a to prevent stray light.

Because the rectangular cones emerging from PBS array 825 are parallel, they will overlap at the focus of condenser lens 826 in FIG. 8b, thereby illuminating rectangular field 827 with a uniform patch of P polarized light.

To accomplish this illumination the dimensions and focal lengths of the FIG. 8b components are preferably chosen by methods that are well known to those skilled in the art. If the beam from light source 801 having width $D_{lamp}$ is divided along one axis into m segments by the lenslets in array 824a, we have:

$$D_{fly's\text{-}eye} = D_{lamp}/m$$

where $D_{fly's\text{-}eye}$ is the width of a lenslet element. It then follows from the optical invariant that $$NA_{fly's\text{-}eye} = m \frac{D_{object} NA_{proj}}{D_{lamp}},$$

where $D_{object}$ is the width of the object at illuminated field 827 and $NA_{proj}$ is the sine of the angular range illuminating this object. The separation between arrays 823a and 824a is approximately $D_{lamp}/2mNA_{fly's\text{-}eye}$, and the focal length of condenser lens 826 is approximately $D_{object}/2NA_{fly's\text{-}eye}$. Thus, the projector becomes more compact and the illumination more uniform when m (and therefore $NA_{fly's\text{-}eye}$) are increased. However, the focal length of condenser lens 826 must be kept large enough to accommodate other optics that may be needed between the object and illuminator, such as color separating prisms(not shown). Furthermore, $NA_{fly's\text{-}eye}$ should be kept below ~10° for efficient performance from the coatings in PBS array 825.

Referring now to FIG. 8d, there is illustrated a different subset of the FIG. 8a embodiment. Light guides 840 are slabs of optical material, preferably glass, like guides 838 in the FIG. 8b subset, but guides 840 are cut in the shape of 45° right triangles. One side of the right angle is positioned against PBS 825 with lenslet array 823b being adjacent to the other side. The lenslet elements 831b of array 823b are preferably molded into guides 840, as shown in FIG. 8d, or alternatively can be contacted together to form a single freestanding element. The thickness of guides 840 is preferably approximately equal to the thickness of PBS array 825 and to the spacing between retarder strips 809. FIG. 8a shows the full illumination apparatus 800, in which the triangular guides 840 of FIG. 8d are interleaved with the rectangular guides 838 of FIG. 8b. Only a very small air space is needed between the guides in order to confine the light, but the gap could be made as large as ~0.1 mm without appreciably impacting light collection into the guides.

The triangular guides shown in FIG. 8d serve to reflect the light from light source 802 into PBS array 825. The 45° hypotenuse faces that accomplish this reflection would not usually need a mirror overcoating for high reflectivity; no light will be transmitted through these faces so long as $NA_{fly's\text{-}eye} < (\sqrt{n^{2-1}}1-1)/\sqrt{2}$. As discussed further below, $NA_{fly's\text{-}eye}$ would typically be ~0.1, so any glass of reasonably high index would provide total reflection. Guides 840 should also be separated by a very small air gap from PBS array 825. If instead the guides were directly coupled to the PBS, a few rays from the closest lenslets in array 823b to PBS 825 would enter the array obliquely, without being reflected from the hypotenuse.

Guides 840 are aligned with retarder strips 809, while guides 838 are aligned with the spaces separating these retarder strips 809, as shown in FIG. 8a. This means that the directly transmitted P polarized component of the light from guides 840 will be converted to S polarization by the retarders, while the component that is initially S will exit PBS array 825 through the spaces separating the retarders, and will therefore remain in S polarization. All collected light from light source 802 therefore emerges from PBS array 825 as S polarization.

In contrast, light from light source 801 emerges from PBS array 838 as P polarization. Illumination apparatus 800 is similar in this respect to the illumination apparatus 400 illustrated in FIGS. 4a–4d, and follows a similar procedure to superimpose the beams in a common polarization (e.g. S). During odd video frames, light source 801 is cycled to approximately 2× instantaneous power, while during even frames it is turned off, or substantially off. Conversely, light source 802 is substantially off during odd frames, and is cycled to 2× instantaneous power during even frames. Both light sources 801, 802 are therefore run at rated power in the time average. During odd frames, modulator 821 rotates the 2× P polarized output from light source 801 to S polarization. Rotation from modulator 821 is switched off during even frames to leave the 2× S polarized output of light source 802 in S polarization. An S polarized beam of 2× intensity therefore enters condenser lens 826 during both the even and odd frames. Illumination apparatus 800 captures approximately the same intensity from two light sources that the FIG. 6 system of the prior art captures from one, yet it delivers this 2× intensity without increasing the width or divergence angle of the beam. As in the FIG. 6 system, one would naturally choose for illumination apparatus 800 light sources with power levels in the optimum range. Light sources with a significantly larger than optimum output power would not be able to deliver the extra power to a projection system with the given lightvalve size and projection lens NA. Thus, the 2× increased power illumination apparatus 800 cannot be achieved in the FIG. 6 system of the prior art by simply employing a more powerful light source.

The descriptions of the various embodiments given thus far have involved the combination of beams from two light sources into a common output beam (though the embodiment of FIG. 3 is not restricted to two light sources). However, these embodiments can all be staged in order to combine more than two light sources. For example, two subsystems according to the above embodiments can each combine two light sources into an output beam, and the two output beams from the two subsystems can then be combined by a third subsystem to produce an output beam common to all four light sources. Each light source would be cycled sequentially to 4× instantaneous intensity with a 25% duty cycle. The two output beams from the first two subsystems would then have 4× instantaneous intensity with a 50% duty cycle, and the overall output beam would be emitted continuously at 4× intensity.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An illumination apparatus comprising:
    at least two light sources, each of which produce independent light beams,
    a controller for sequentially driving each of the light sources at a high power above their respective maximum rated power, to produce a respective light beam for each light source, and for leaving the remaining light sources at a low power below their respective maximum rated power, such that the time-average of the high and low power levels are set to a predetermined value for each of the light sources, and
    combining and directing means for sequentially combining each of the light beams from their respective light sources while being driven at high power into a common output beam with a fixed direction.

2. The illumination apparatus according to claim 1, wherein the combining and directing means comprises an array of tiltable mirrors that sequentially direct each of the light beams from their respective light sources while being driven at high power into a common output direction.

3. The illumination apparatus according to claim 2, wherein the at least two light sources comprise first and second light sources, and wherein the array of tiltable mirrors are capable of achieving first and second tilted positions relative to the array of tiltable mirrors and corresponding to the first and second light sources, respectively, the array of tiltable mirrors being tilted towards their respective light sources while being driven at the high power.

4. The illumination apparatus of claim 3, wherein the first and second light sources are further tilted towards the array of tiltable mirrors.

5. The illumination apparatus of claim 4, wherein the first and second light sources are tilted at an angle twice that of its respective tilted position.

6. The illumination apparatus according to claim 1, further comprising a switchable polarization rotator that sequentially converts the polarization of the light beams produced by each of the light sources into a common polarization.

7. The illumination apparatus according to claim 6, wherein the operation of the switchable polarization rotator is based on a tunable birefringence effect.

8. The illumination apparatus according to claim 6, wherein the operation of the switchable polarization rotator is based on a wave-guide effect.

9. The illumination apparatus according to claim 6, wherein the operation of the switchable polarization rotator is based on a surface-stabilized ferroelectric liquid crystal cell effect.

10. The illumination apparatus according to claim 1, wherein the predetermined value for each of the light sources is their respective maximum rated power.

11. The illumination apparatus according to claim 10, wherein two light sources are used, and wherein the high power is two times the maximum rated power of the light sources and the low power is substantially zero.

12. The illumination apparatus according to claim 1, wherein the light sources are metal halide lamps.

13. The illumination apparatus according to claim 1, wherein the controller also controls the combining and directing means for coordinating the sequential driving of the light sources and the sequential combining and directing of the light beams from their respective light sources.

14. The illumination apparatus according to claim 1, further comprising a detector for detecting the intensity of the light beams and inputting the controller to modify the power to the light sources in response thereto.

15. The illumination apparatus according to claim 1, wherein the at least two light sources comprise first and second light sources in which the produced light beams from each light source having a first and a second polarization, and wherein the combining and directing means comprises an optical system.

16. The illumination apparatus according to claim 15, wherein the optical system comprises:
    a polarizing beamsplitter for transmitting light of the first polarization and reflecting light of the second polarization,
    a fold mirror collecting either the transmitted or reflected light from the beamsplitter and directing the collected light in a direction parallel to the other light,
    a half-wave retarder rotating either the transmitted or reflected light from the beamsplitter, and
    a condenser lens collecting the parallel transmitted and reflected light from the beamsplitter.

17. The illumination apparatus according to claim 16, further comprising a detector for detecting the intensity of the light beams and inputting the controller to modify the power to the light sources in response thereto.

18. The illumination apparatus according to claim 16, further comprising a switchable polarization rotator for sequentially converting the polarization of the transmitted and reflected light produced by each of the first and second light sources into a common polarization.

19. The illumination apparatus according to claim 18, wherein the operation of the switchable polarization rotator is based on a tunable birefringence effect.

20. The illumination apparatus according to claim 18, wherein the operation of the switchable polarization rotator is based on a wave-guide effect.

21. The illumination apparatus according to claim 18, wherein the operation of the switchable polarization rotator is based on a surface-stabilized ferroelectric liquid crystal cell effect.

22. The illumination apparatus according to claim 18, wherein the controller also controls the switchable polarization rotator for coordinating the sequential driving of the light sources and the sequential conversion of the polarization of the transmitted and reflected light produced by each of the first and second light sources into a common polarization.

23. The illumination apparatus according to claim 16, wherein the light sources are configured such that the light beam from each respective light source is made to substantially focus in the vicinity of the fold mirror and condenser lens.

24. The illumination apparatus according to claim 15, wherein the optical system comprises:
    first and second sets of light guides corresponding to the first and second light sources, each individual light guide having two pairs of substantially parallel surfaces,
    first and second pairs of lenslet arrays corresponding to the first and second light sources for focusing the light from individual lenslets into a corresponding individual light guide, a polarizing beam splitter array for directly transmitting the light of the first polarization from each of the first and second sets of light guides, and transmitting the light of the second polarization from the first and second sets of light guides after reflection from the substantially parallel surfaces, and half-wave retarding strips for converting either the directly transmitted light of the first polarization or the twice-reflected light of the second polarization to match the other of the polarization components.

25. The illumination apparatus according to claim 24, further comprising a switchable polarization rotator for sequentially converting the polarization of the beams produced by each of the first and second light sources into a common output polarization.

26. The illumination apparatus according to claim 25, wherein the operation of the switchable polarization rotator is based on a tunable birefringence effect.

27. The illumination apparatus according to claim 25, wherein the operation of the switchable polarization rotator is based on a wave-guide effect.

28. The illumination apparatus according to claim 25, wherein the operation of the switchable polarization rotator is based on a surface-stabilized ferroelectric liquid crystal cell effect.

29. The illumination apparatus according to claim 25, wherein the controller also controls the switchable polarization rotator for coordinating the sequential driving of the light sources and the sequential conversion of the polarization of the transmitted and reflected light produced by each of the first and second light sources into a common polarization.

30. The illumination apparatus according to claim 24, further comprising a detector for detecting the intensity of the light beams and inputting the controller to modify the power to the light sources in response thereto.

31. The illumination apparatus according to claim 24, wherein the first and second light guides are interleaved with each other to produce a compact illumination system.

32. A method for increasing illumination in an illumination apparatus, the method comprising the steps of:
producing independent light beams, from at least two light sources,
sequentially driving each of the light sources at a high power above their respective maximum rated power for producing the respective light beam for each light source, while leaving the remaining light sources at a low power below their respective maximum rated power, such that the time-average of the high and low power levels are set to a predetermined value for each of the light sources, and
sequentially combining each of the light beams from their respective light sources while being driven at high power into a common output beam with a fixed direction.

33. The method according to claim 32, wherein the combining step comprises titling an array of tiltable mirrors for sequentially directing each of the light beams from their respective light sources while being driven at high power into a common output direction.

34. The method according to claim 32, further comprising the step of sequentially converting the polarization of the light beams produced by each of the light sources into a common polarization.

35. The method according to claim 32, further comprising the steps of detecting the intensity of the light beams and inputting the controller to modify the power to the light sources in response thereto.

36. The method according to claim 32, wherein the illumination apparatus is used in a projection display and wherein the method further comprising the steps of:
displaying sequential image frames on at least one lightvalve,
illuminating the at least one lightvalve with the common output beam by which the displayed sequential image frame is reflected, and
projecting the displayed sequential image frames of the at least one illuminated lightvalve onto a screen.

37. An illumination apparatus comprising:
at least two light sources, each of which produce independent light beams,
a controller for sequentially driving each of the light sources at a high power above their respective maximum rated power, to produce a respective light beam for each light source, and for leaving the remaining light sources at a low power below their respective maximum rated power, such that the time-average of the high and low power levels are set to a predetermined value for each of the light sources,
combining and directing means for sequentially combining each of the light beams from their respective light sources while being driven at high power into a common output beam with a fixed direction, said combining and directing means comprising an array of tiltable mirrors that sequentially direct each of the light beams from their respective light sources while being driven at said high power,said at least two light sources comprising first and second light sources, and wherein the array of tiltable mirrors are capable of achieving first and second tilted positions relative to the array of tiltable mirrors and corresponding to the first and second light sources, respectively, the array of tiltable mirrors being tilted towards their respective light sources while being driven at the high power, and said first and second light sources being further tilted towards the array of tiltable mirrors.

38. The illumination apparatus of claim 37, wherein the first and second light sources are tilted at an angle twice that of its respective tilted position.

39. The illumination apparatus according to claim 37, wherein the predetermined value for each of the light sources is their respective maximum rated power.

40. The illumination apparatus according to claim 39, wherein two light sources are used, and wherein the high power is two times the maximum rated power of the light sources and the low power is substantially zero.

41. The illumination apparatus according to claim 37, wherein the light sources are metal halide lamps.

42. The illumination apparatus according to claim 37, wherein the controller also controls the combining and directing means for coordinating the sequential driving of the light sources and the sequential combining and directing of the light beams from their respective light sources.

43. The illumination apparatus according to claim 37, further comprising a detector for detecting the intensity of the light beams and inputting the controller to modify the power to the light sources in response thereto.

44. A method for increasing illumination in an illumination apparatus, the method comprising the steps of:
producing independent light beams, from at least two light sources,
sequentially driving each of the light sources at a high power above their respective maximum rated power for producing the respective light beam for each light source, while leaving the remaining light sources at a low power below their respective maximum rated power, such that the time-average of the high and low power levels are set to a predetermined value for each of the light sources, sequentially combining each of the light beams from their respective light sources while being driven at high power into a common output beam with a fixed direction, tiling an array of tiltable mirrors during said combining step for sequentially directing each of the light beams from their respective light sources while being driven at high power into a common output direction, and further comprising the steps of detecting the intensity of the light beams and inputting the controller to modify the power to the light sources in response thereto.

* * * * *